United States Patent
Kim et al.

(10) Patent No.: US 8,896,530 B2
(45) Date of Patent: Nov. 25, 2014

(54) DISPLAY DEVICE AND METHOD FOR REMOTELY CONTROLLING DISPLAY DEVICE

(75) Inventors: Hoyoun Kim, Pyeongtaek-si (KR); Daeyoung Jung, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 13/420,994

(22) Filed: Mar. 15, 2012

(65) Prior Publication Data
US 2012/0299815 A1 Nov. 29, 2012

(30) Foreign Application Priority Data
May 26, 2011 (KR) .................. 10-2011-0050171

(51) Int. Cl.
G06F 3/033 (2013.01)
H04N 21/41 (2011.01)
H04N 21/472 (2011.01)
H04N 21/443 (2011.01)
H04N 21/431 (2011.01)

(52) U.S. Cl.
CPC ......... *H04N 21/4126* (2013.01); *H04N 21/472* (2013.01); *H04N 21/4438* (2013.01); *H04N 21/4316* (2013.01)
USPC ........................................ 345/158; 345/156

(58) Field of Classification Search
CPC .............. G06F 3/00; G06F 3/01; G06F 3/048
See application file for complete search history.

(56) References Cited

U.S. PATENT DOCUMENTS

2009/0085871 A1* 4/2009 Bhogal et al. ................. 345/163

FOREIGN PATENT DOCUMENTS

| JP | 2008-011050 A | 1/2008 |
| JP | 2011-071715 A | 4/2011 |
| KR | 10-0880475 B1 | 1/2009 |

OTHER PUBLICATIONS

International Search Report and Written Opinion dated Sep. 27, 2012 issued in Application No. PCT/KR2012/001625.

* cited by examiner

*Primary Examiner* — Joseph Haley
*Assistant Examiner* — Ifedayo Iluyomade
(74) *Attorney, Agent, or Firm* — Ked & Associates, LLP

(57) ABSTRACT

A display device and a method for remotely controlling the display device are disclosed. A controller executes a first application and a second application. A display displays a main window, which displays an execution screen of the executed first application, and a first sub window which displays an execution screen of the executed second application, on a screen. A receiver receives a focus switching signal from a first remote controller and a coupling signal containing an identifier from a second remote controller. The controller switches a focused window based on the received focus switching signal and implements coupling between the focused window and the second remote controller in response to the received coupling signal.

19 Claims, 23 Drawing Sheets

FIG. 7

```
            < sub window configuration>
            < Number of windows : 3 />
            < Sub window layout method :>

710       < sub window name=browser1, x_pos=1 , y_pos=1, width=1280, height=1080>
            </sub window>

720       < sub window name=browser2, x_pos= 1281, y_pos=1, width=640,
            height=810> </sub window>

730       < sub window name=browser3, x_pos=1281, y_pos=811, width=640,
            height=270> </sub window>

</Sub window layout method >
```

```
<xsl:if test =!window_exist(1.1)>
< sub window name=browser, x_pos=1 , y_pos=1, width=1280, height=1080>
</sub window>
</xsl:if>

<xsl:if test =window_exist(1.1)>
< sub window name=browser, x_pos= 1281, y_pos=1, width=640, height=810>
</sub window>
</xsl:if>
```

910 — (first block)
920 — (second block)

DISPLAY DEVICE AND METHOD FOR REMOTELY CONTROLLING DISPLAY DEVICE

This application claims the benefit of Korean Patent Application No. 10-2011-0050171, filed on May 26, 2011, which is hereby incorporated by reference as if fully set forth herein.

BACKGROUND OF THE INVENTION

1. Field of the Invention

The present invention relates to a display device and a method for remotely controlling the display device and more particularly, to a display device and a remote control method for the display device using a remote controller.

2. Discussion of the Related Art

Display devices have, for example, a function for receiving and processing a broadcast image viewable by a user. Such a display device may display a broadcast, which is selected by the user from among broadcast signals transmitted from a broadcast station, on a display. Currently broadcasters are transitioning from analog broadcasting to digital broadcasting.

Digital broadcasting refers to broadcasting of transmitting digital audio and video signals. Digital broadcasting has low data loss due to robustness against external noise, favorable error correction, high resolution and high-definition screen, as compared with analog broadcasting. In addition, digital broadcasting may provide a bidirectional service unlike analog broadcasting.

To enable utilization of digital broadcasting, multimedia devices have been developed to have higher performance and a greater number of functions than conventional multimedia devices and in turn, services available to the multimedia devices have been diversified into Internet services, Video On Demand (VOD), electronic album services, and the like.

In conventional display devices, in the case in which a plurality of applications is displayed on a screen, a user is able to control each application by focusing a single remote controller on one of the applications that the user wishes to control and then, pressing a specific key on the remote controller. Accordingly, if two or more users attempt to simultaneously utilize his/her own application, operation of multiple applications is not possible, but each user who wishes to control his/her own application must wait their turn to use the remote controller.

SUMMARY OF THE INVENTION

Accordingly, the present invention is directed to a display device and a method for remotely controlling the display service that substantially obviate one or more problems due to limitations and disadvantages of the related art.

One object of the present invention is to provide a display device and a method for remotely controlling the display device, which enable execution of multiple applications without hindering viewing of broadcast programs.

Another object of the present invention is to provide a display device and a method for remotely controlling the display device, which enable a plurality of users to control executed applications using different respective remote controllers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for remotely controlling a display device includes displaying a main window, which displays an execution screen of a first application, on a screen of the display device, executing a second application and displaying a first sub window, which displays an execution screen of the executed second application, on the screen, receiving a focus switching signal from a first remote controller, the first remote controller being coupled with the main window, switching a focused window based on the received focus switching signal, receiving a coupling signal containing an identifier from a second remote controller, and coupling the focused window with the second remote controller in response to the received coupling signal.

The method may further include displaying a coupling execution checking message by means of the second remote controller, receiving an approval signal from the first remote controller in response to the message, and displaying a coupling execution guide message in response to the received approval signal.

The coupling may include transmitting the identifier to an application associated with the focused window, and controlling the associated application to store the transmitted identifier in a storage area assigned to the application.

The method may further include receiving a command signal containing an identifier and a key value from one of the first remote controller and the second remote controller, transmitting the command signal to the first application and the second application in response to the received command signal, controlling the first application to check whether or not the identifier contained in the command signal is equal to an identifier stored in a storage area assigned to the first application and to implement a command indicated by the key value if both the identifiers are equal, and controlling the second application to check whether or not the identifier contained in the command signal is equal to an identifier stored in a storage area assigned to the second application and to implement the command indicated by the key value if both the identifiers are equal.

The coupling may include associating the identifier with an identifier of the executed second application to store the associated identifiers in a coupling table.

The method may further include receiving a command signal containing an identifier and a key value from one of the first remote controller and the second remote controller, searching for an identifier of an application associated with the identifier contained in the command signal from the coupling table in response to the received command signal, and transmitting the command signal to the application having the identifier associated with the identifier of the command signal.

The first sub window may be displayed at a position defined by a code of the second application. The method may further include executing a third application and displaying a second sub window, which displays an execution screen of the executed third application, on the screen, and the displaying the second sub window may include checking whether or not a window is present at a first position defined in a code of the third application, displaying the second sub window at a second position defined in the code of the third application if the window is present at the first position, and displaying the second sub window at the first position if the window is not present at the first position.

The first sub window may be displayed based on a preset window layout mode. The method may further include executing a third application and displaying a second sub window, which displays an execution screen of the executed third application, on the screen, and the displaying the second sub window may include selecting one of regions where a window is not present from among regions indicated by the window layout mode, and displaying the second sub window on the selected region.

In accordance with another aspect of the invention, a display device includes a controller to execute a first application and a second application, a display to display a main window, which displays an execution screen of the executed first application, and a first sub window which displays an execution screen of the executed second application, on a screen, and a receiver to receive a focus switching signal from a first remote controller and to receive a coupling signal containing an identifier from a second remote controller, wherein the controller switches a focused window based on the received focus switching signal and implements coupling between the focused window and the second remote controller in response to the received coupling signal.

The controller may control display of a coupling execution checking message by means of the second remote controller, and may control display of a coupling execution guide message if an approval signal from the first remote controller is received in response to the coupling execution checking message.

The controller may transmit the identifier to an application associated with the focused window, and may control the application to store the transmitted identifier in a storage area assigned to the application.

The receiver may further receive a command signal containing an identifier and a key value from one of the first remote controller and the second remote controller, and the controller may transmit the command signal to the first application and the second application in response to the received command signal, may control the first application to check whether or not the identifier contained in the command signal is equal to the identifier stored in the storage area assigned to the first application and to implement a command indicated by the key value according to the checked result, and may control the second application to check whether or not the identifier contained in the command signal is equal to the identifier stored in the storage area assigned to the second application and to implement the command indicated by the key value according to the checked result.

The controller may associate the identifier with the identifier of the executed second application to store the associated identifiers in a coupling table.

The receiver may receive a command signal containing an identifier and a key value from one of the first remote controller and the second remote controller, and the controller may search for an identifier of an application associated with the identifier contained in the command signal from the coupling table in response to the received command signal, and may transmit the command signal to the searched application having the identifier associated with the identifier of the command signal.

The first sub window may be displayed at a position defined in a code of the second application. The controller may further execute a third application and check whether or not a window is present at a first position defined in a code of the third application, may control display of a second sub window, which displays an execution screen of the executed third application, at a second position defined in a code of the third application if the window is present at the first position, and may control display of the second sub window at the first position if the window is not present at the first position.

The first sub window may be displayed based on a window layout mode selected by a user. The controller may execute a third application, selects a region where a window is not present from among regions indicated by the window layout mode, and controls display of a second sub window, which displays an execution screen of the executed third application, on the selected region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a view illustrating another exemplary embodiment of a code of an application that defines a window layout.

DETAILED DESCRIPTION OF THE INVENTION

Figure 1:
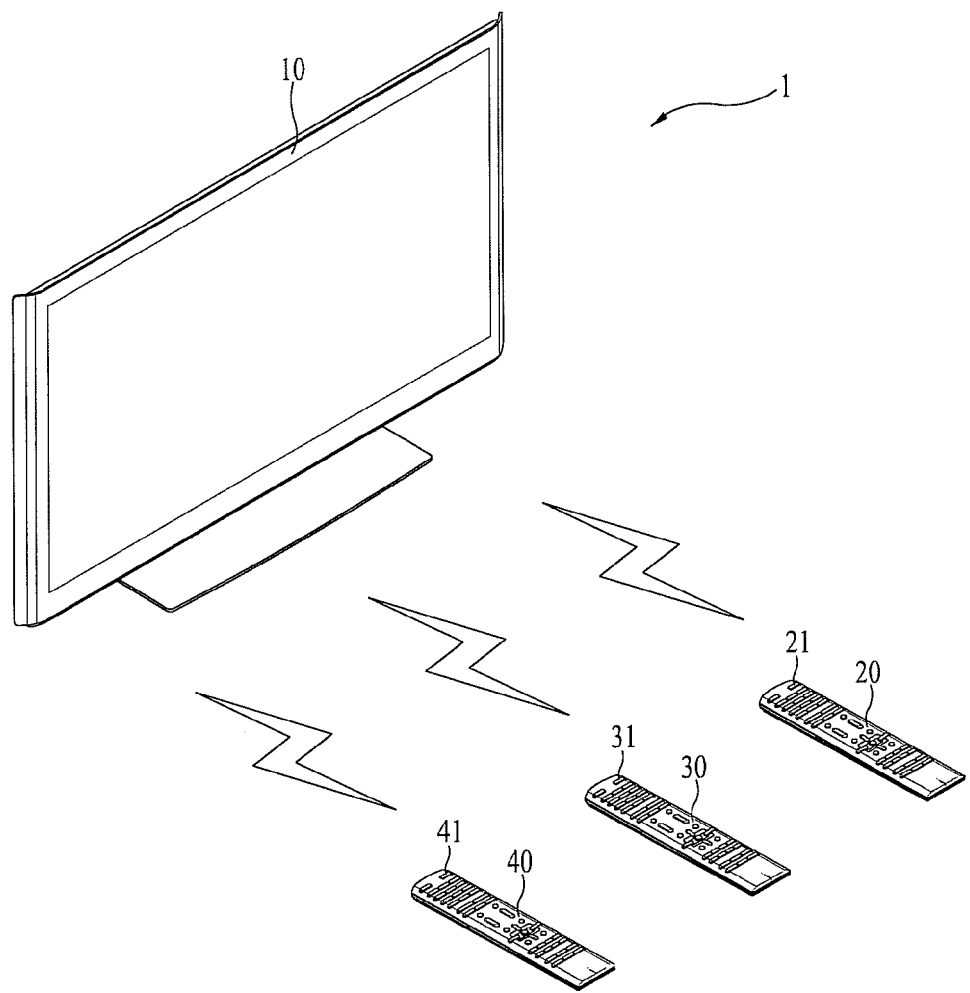
FIG. 1 is a schematic view illustrating the configuration of a display system in accordance with an exemplary embodiment of the present invention.

Exemplary embodiments of the present invention that can embody the above described objects will be described with reference to the attached drawings. Here, it should be understood that configurations and operations of the present invention that are illustrated in the drawings and explained in conjunction with the illustration are merely described as at least one embodiment and the technical ideas and essential configurations and operations of the present invention are not limited by the description.

Although the terms used in the present invention are selected from generally known and used terms in consideration of functions thereof in the present invention, these terms may vary according to intentions of those who skilled in the art, usual practice or advent of novel technologies. Furthermore, the terms may be selected at the discretion of the applicant in special cases and in this case, the detailed meanings of these terms are described in relevant parts of the description herein. Accordingly, the terms used herein should be understood not simply by the actual terms used but by the meaning lying within and the description disclosed herein.

FIG. 1 is a schematic view illustrating the configuration of a display system in accordance with an exemplary embodiment of the present invention.

Referring to FIG. 1, the display system 1 may include a display device 10 and a plurality of remote controllers 20, 30 and 40. The display device 10 may be a personal computer, such as a desktop computer, a laptop computer, a tablet, a handheld computer, etc. Additionally or selectively, the display device 10 may be a mobile terminal, such as a cellular phone, a smart phone, a digital multimedia broadcasting terminal, a Personal Digital Assistant (PDA), a Portable Multimedia Player (PMP), a navigator, etc, or may be a fixed electronic appliance, such as a digital TV.

The display device 10 and the plurality of remote controllers 20, 30 and 40 may be manufactured and sold as a single product, or may be manufactured and sold as individual products.

The plurality of remote controllers 20, 30 and 40 may be coupled respectively with the display device 10. This coupled state refers to a state in which the display device 10 is controllable by the remote controllers 20, 30 and 40. The plurality of remote controllers 20, 30 and 40 may respectively include coupling keys 21, 31 and 41. If a user performs a user action of pressing the coupling keys 21, 31 and 41, the plurality of remote controllers 20, 30 and 40 may transmit coupling signals to the display device 10 in response to the user action.

The plurality of remote controllers 20, 30 and 40 may be replaced by a single main remote controller. The main remote controller is adapted to control a focused application without requiring a separate coupling procedure with respect to the application. As such, coupling between a remote controller and an application refers to a state in which the remote controller is able to control the application. Thus, it is possible for the user to control the application using the remote controller coupled with the application without separate focus switching.

Figure 2:
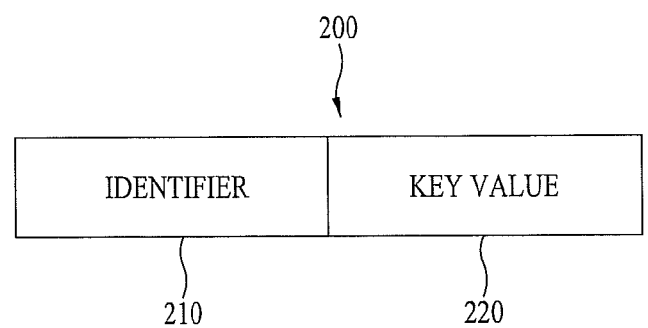
FIG. 2 is a view illustrating the format of a signal transmitted from a remote controller in accordance with an exemplary embodiment of the present invention.

FIG. 2 is a view illustrating the format of a signal transmitted from a remote controller in accordance with an exemplary embodiment of the present invention.

Referring to FIG. 2, a remote controller transmission signal 200 may contain an identifier field 210 and a key value field 220. The remote controller transmission signal 200 may include a coupling signal and a command signal. The coupling signal contains a key value to indicate coupling in the key value field 220. The command signal contains a key value to indicate a command or operation to be implemented by the display device 10 in the key value field 220. For example, the command signal may be a focus switching signal, an approval signal, or a refusal signal. The focus switching signal contains a key value to indicate a command for switching from a focused window to another window. The approval signal contains a key value to indicate implementation of a specific operation, and the refusal signal contains a key value to indicate refusal of implementation of a specific operation.

In some embodiments, the approval signal and the refusal signal may contain a key value to indicate selection. In this case, the display device 10 may search for a command to be implemented based on the approval signal (or the refusal signal) and a selected soft button of a Graphical User Interface (GUI) displayed on a screen of the display device 10.

The identifier field 210 may contain an identifier to identify a remote controller. The identifier may be a device ID, a serial number and identification information produced via a pairing process. The pairing process is a process for setting a communication connection between the display device 10 and a remote controller which uses RF signals, and serves to produce and store identification information for RF communication between the display device 10 and the remote controller. The identification information may be a Net ID or Mac Address for RF communication.

The key value field 220 contains a key value. The key value is a specific code value to indicate a command or operation to be implemented by the display device 10. That is to say, the display device 10 may implement a command indicated by a key value transmitted thereto. The code value may be mapped to a command or operation to be implemented by the display device 10. The display device 10 may search for a command or operation mapped to the key value contained in the remote controller transmission signal 200 and then, may implement the searched operation or command.

If the user performs a user action of pressing a specific button on a remote controller, the remote controller provides an identifier for the identifier field 210 and a key value, assigned to the pressed button, for the key value field 220 and thereafter, may transmit the resulting remote controller transmission signal 200 to the display device 10.

In an alternative embodiment, the remote controller transmission signal may further include additional fields.

Figure 3:
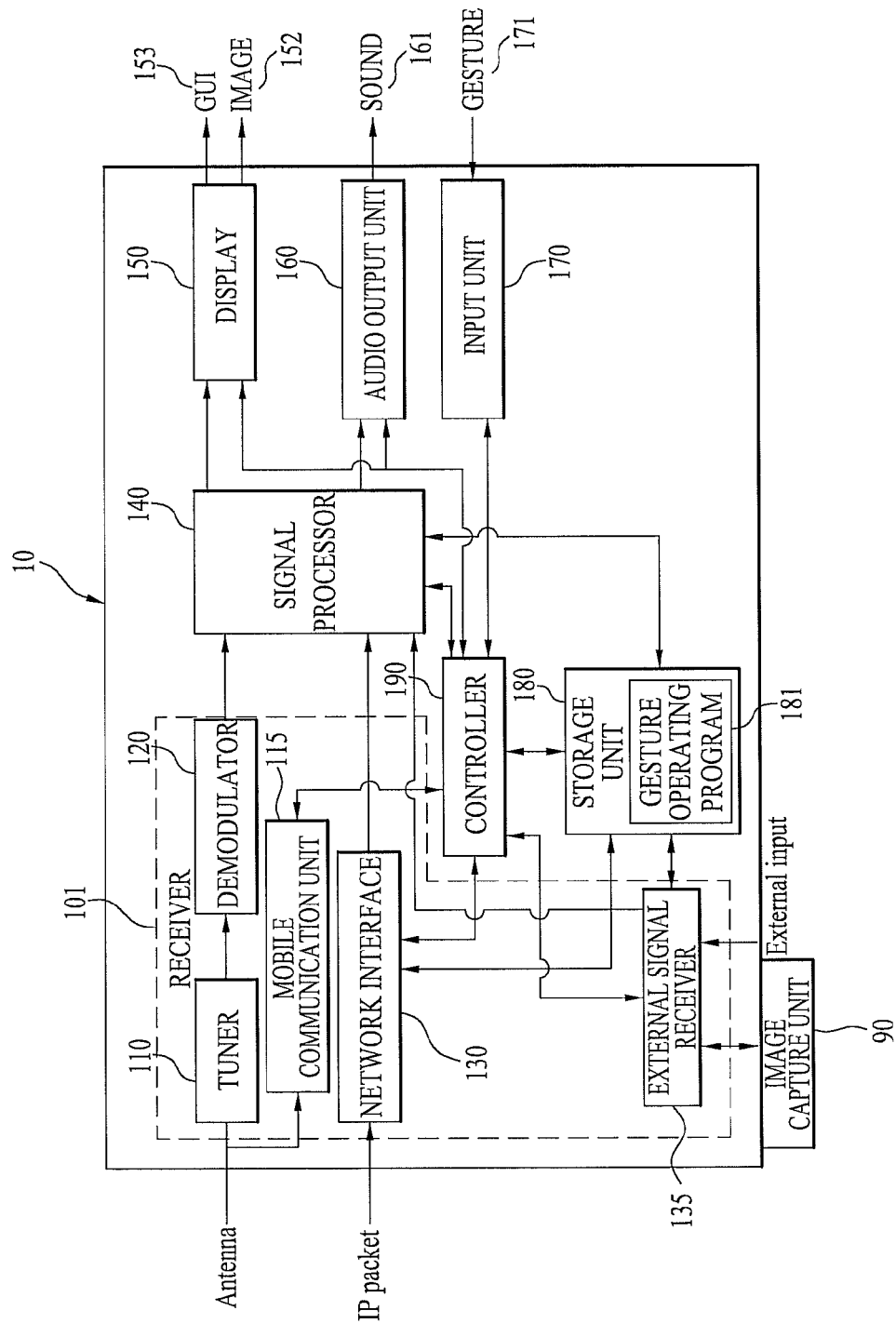
FIG. 3 is a block diagram illustrating the configuration of a display device in accordance with an exemplary embodiment of the present invention.

FIG. 3 is a block diagram illustrating the configuration of a display device in accordance with an exemplary embodiment of the present invention.

Referring to FIG. 3, the display device 10 in accordance with the present invention may include a receiver 101, a signal processor 140, a display 150, an audio output unit 160, an input unit 170, a storage unit 180 and a controller 190. In some embodiments, the display device 10 may include an image capture unit 90.

The receiver 101 may receive broadcast data, video data, audio data, information data, and applications. The receiver 101 may include a tuner 110, a demodulator 120, a mobile communication unit 115, a network interface 130 and an external signal receiver 135. The tuner 110 may receive applications via a broadcast network, and the mobile communication unit 115 may receive applications via a mobile communication network, such as a 2 G communication network, a 3 G communication network, a 4 G communication network, etc. The network interface 130 may receive applications via an Internet network, and the external signal receiver 135 may receive applications from an external device, such as a computer, a USB memory, a recording media reproducing device, etc.

The signal processor 140 may demultiplex a stream signal output from the demodulator 210 and then, implement processing of the demultiplexed signal (video decoding and audio decoding) and thereafter, may output an image 152 via the display 150 and sound 161 via the audio output unit 160. Additionally, the signal processor 140 may receive video data, audio data, broadcast data and application data from the mobile communication unit 115, the network interface 130 and the external signal receiver 135.

The display 150 serves to display the image 152. The display 150 may be operated in connection with the controller 190. The display 150 may display a Graphical User Interface (GUI), which provides an interface for allowing the user to easily access an operating system (OS) of the display device 10 or an application that is being executed on the operating system.

The display 150 may display a window that displays an execution screen of an application that is being executed. The window may include a main window and a sub window. The main window refers to a window that is first displayed from among a plurality of windows on a screen and the sub window refers to the other window.

The audio output unit 160 may receive audio data from the signal processor 140 and the controller 190 and then, may output the sound 161 via reproduction of the received audio data.

The input unit 170 may be a touch screen which is arranged on the display 150 or at the front of the display 150, or may be a communication unit which receives a signal from a remote controller. The input unit 170 may receive the remote controller transmission signal 200 from the plurality of remote controllers 20, 30 and 40.

In some embodiments, the receiver 101 may be a communication unit to receive a signal from a remote controller. Specifically, the external signal receiver 135 may receive the remote controller transmission signal 200 from the plurality of remote controllers 20, 30 and 40.

The storage unit 180 provides a location where program code and data to be used by the display device 10 are stored. The program code may be code of an application that the receiver 101 receives and code of an application previously stored upon manufacture of the display device 10. The application may be programmed in programming languages, such as HTML, XML, HTML5, CSS, CSS3, JavaScript, Java, C, C++, Visual C++, c#, etc.

The storage unit 180 may be implemented as a Read-Only Memory (ROM), a Random Access Memory (RAM), a hard disk drive, or the like. The program code and data may be stored in a separable storage medium and may be loaded or installed onto the display device 100 as necessary. The separable storage medium may include a CD-ROM, a PC-CARD, a memory card, a floppy disk, a magnetic tape and a network component.

The controller 190 serves to execute an instruction and implement an operation associated with the display device 10. For example, the controller 190 may control reception and processing of input and output data between components of the display device 10 using an instruction searched from the storage unit 180. Additionally, the controller 190 may search for an instruction mapped to a key value contained in the received remote controller transmission signal 200 and then, may execute the searched instruction.

The controller 190 further serves to execute program code together with an operating system and to produce and use data. The operating system is generally known and therefore, a detailed description thereof is omitted. An example of the operating system may include Windows OS, Unix, Linux, Palm OS, DOS, Android, and Mac OS. The operating system, other computer code and data may be present within the storage unit 180 which is operated in connection with the controller 190.

The controller 190 may be implemented on a single chip, a plurality of chips, or a plurality of electric components. For example, a variety of architectures, including a dedicated or embedded processor, a single purpose processor, a controller, an Application Specific Integrated Circuit (ASIC), etc., may be used with respect to the controller 190.

The controller 190 may recognize a user action and may control the display device 10 based on the recognized user action. The user action may include selection of a physical button on the display device 10 or a remote controller, execution of a prescribed gesture or selection of a soft button on a touch screen display, execution of a prescribed gesture recognized from an image captured through an image capture unit, and production of prescribed sound recognized by sound recognition. The gesture may include a touch gesture and a spatial gesture.

The input unit 170 receives a gesture 171, and the controller 190 executes instructions to implement operations associated with the gesture 171. Additionally, the storage unit 180 may contain a gesture operating program 181, which may be a part of an operating system or a separate application. The gesture operating program 181 generally contains a series of instructions for recognizing occurrence of the gesture 171 and informing one or more software agents of the gesture 171 and/or which actions should be taken in response to the gesture 171.

Figure 4:
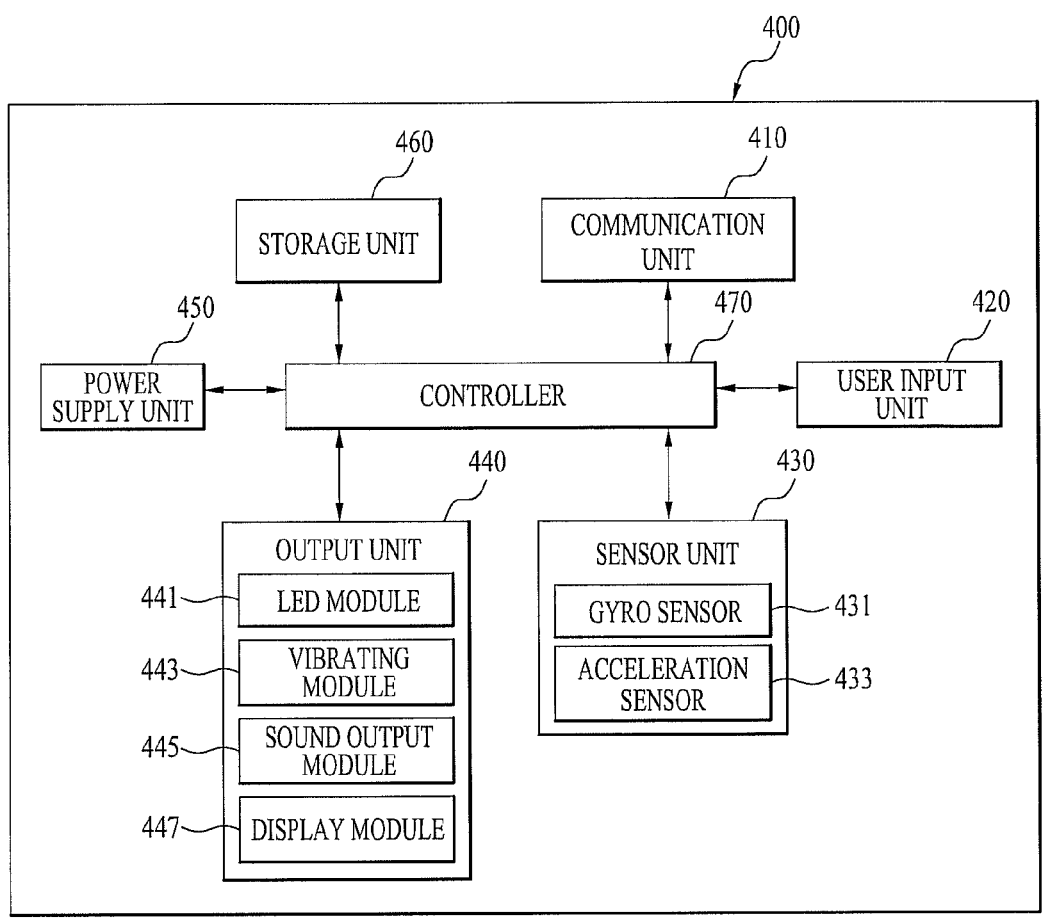
FIG. 4 is a block diagram illustrating the configuration of a remote controller in accordance with an exemplary embodiment of the present invention.

FIG. 4 is a block diagram illustrating the configuration of a remote controller in accordance with an exemplary embodiment of the present invention.

Referring to FIG. 4, the remote controller 400 may include a communication unit 410, a user input unit 420, a sensor unit 430, an output unit 440, a power supply unit 450, a storage unit 460 and a controller 470. The remote controllers 20, 30 and 40 illustrated in FIG. 1 may be the remote controller 400.

The communication unit 410 may be a communication module to provide bidirectional (or non-directional) communication means and may implement wireless communication with the display device 10 according to a predetermined communication standard. The communication standard may be Zigbee, Bluetooth, Ultra Wideband (UWB), Radio Frequency Identification (RFID) and Wireless Lan. The communication unit 410 may transmit the remote controller transmission signal 200 illustrated in FIG. 2 to the display device 10 according to the aforementioned communication standard.

The controller 470 may control general operations of the remote controller 400. The controller 470 may control the communication unit 410 so as to produce the remote controller transmission signal 200 and transmit the produced remote controller transmission signal 200.

The user input unit 420 may take the form of a keypad, button array, touch pad, touch screen, or the like. The user may input a command to control the display device 10 by operating the user input unit 420 of the remote controller 400. The controller 470 may provide a key value, which is associated with a command that the user input unit 420 receives, for the key value field 200, thereby producing the remote controller transmission signal 200.

The sensor unit 430 may include a Gyro sensor 431 and an acceleration sensor 433.

The Gyro sensor 431 may sense movement of the remote controller 400 and produce sensing information. In one example, the Gyro sensor 431 may sense movement of the remote controller 400 on the basis of x, y and z axes and produce information that indicates a spatial vector based on the sensed results. The information that indicates the produced spatial vector may be contained in the key value field 220 or an additional field of the remote controller transmission signal 200 to thereby be transmittable by the remote controller transmission signal 200.

The acceleration sensor 243 may sense a movement speed of the remote controller 400 and produce sensing information that indicates the sensed movement speed. The produced sensing information may be contained in the key value field 220 or an additional field of the remote controller transmission signal 200 to thereby be transmittable by the remote controller transmission signal 200.

In some embodiments, the remote controller 400 may further include a distance measuring sensor. The distance measuring sensor may serve to sense a distance between the display device 10 and the remote controller 400. The sensed distance may be contained in the key value field 220 or an additional field of the remote controller transmission signal 200 to thereby be transmittable by the remote controller transmission signal 200.

The output unit 440 may output a video or audio signal that corresponds to operation of the user input unit 420 or corresponds to a signal transmitted from the display device 10. The output unit 440 may include an LED module 441 adapted to be turned on or off, a vibrating module 443 adapted to vibrate, a sound output module 445 adapted to output sound, or a display module 447 adapted to display an image, all of which are operated as the user operates the user input unit 420 or by reception/sending of signals between the display device 10 and the communication unit 410.

The power supply unit 450 serves to supply electric power to the remote controller 400. The power supply unit 450 stops the supply of electric power when the remote controller 400 does not move for a predetermined time, which may reduce waste of electric power. The power supply unit 450 may restart the supply of electric power when a predetermined key included in the remote controller 400 is operated.

The storage unit 460 may store various kinds of programs, program data, identifiers, key values and the like, which are required for operation or control of the display device 10. The identifiers are required for identification of the remote controller and may include a Device ID, a serial number and identification information produced via a pairing process. The identifiers may be contained in the identifier field 210 of the remote controller transmission signal 200 to thereby be transmittable by the remote controller transmission signal 200.

The storage unit 460 may store information on a frequency band. The remote controller 400 may receive and send a signal from and to the display device 10 via the frequency band indicated by the stored information. The information on the frequency band may include information that indicates a management frequency channel and information that indicates a pairing frequency channel. During a pairing process, the management frequency channel may be used to transmit a first RF signal for requesting pairing and to receive a second RF signal as a response signal with respect to the first RF signal. The pairing frequency channel may be set during the pairing process. Once pairing has been completed, transmission of RF signals between the display device 10 and the remote controller 400 may be implemented through the pairing frequency channel.

Figure 5:
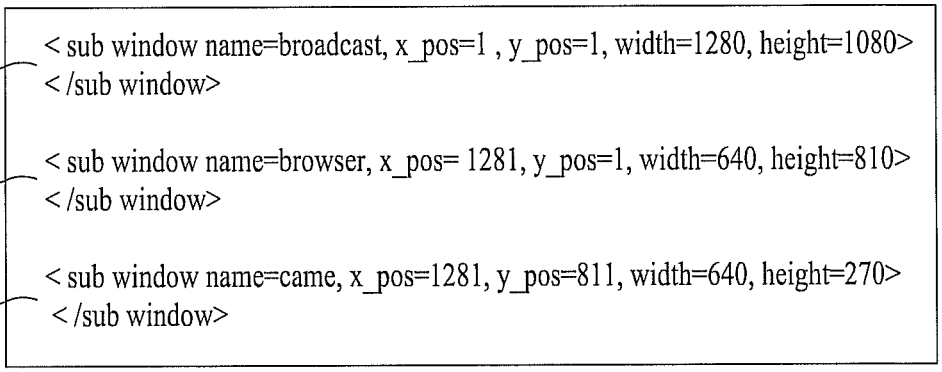
FIG. 5 is a view illustrating exemplary embodiments of a code of an application that defines a window layout.

FIG. 5 is a view illustrating exemplary embodiments of a code of an application that defines a window layout.

Referring to FIG. 5, an application may include a window layout code to define the layout of a window that displays an execution screen of the application. That is to say, in the design stage of an application, a designer may previously define how a window will be laid out. The controller 190 may control display of a window with respect to a region as defined by the layout code.

In the embodiment of FIG. 5, the layout code is defined in XML. In addition to XML, the layout code may be defined in other programming languages, such as HTML, HTML5, CSS, CSS3, JavaScript, Java, C, C++, Visual C++, C#, etc.

'Name' refers to a name of the window, 'x_pos' and 'y_pos' refer to horizontal and vertical coordinates of a display position of the window, 'width' refers to a horizontal length of the window, and 'height' refers to a vertical length of the window. A reference resolution of the layout code illustrated in FIG. 5 is 1920×1080.

A window by the name of 'broadcast' is displayed at a position indicated by coordinates (1, 1) and has a width of 1280 pixels and a height of 1080 pixels.

A window by the name of 'browser' is displayed at a position indicated by coordinates (1281, 1) and has a width of 640 pixels and a height of 810 pixels.

A window by the name of 'came' is displayed at a position indicated by coordinates (1281, 811) and has a width of 640 pixels and a height of 270 pixels.

Although the width and height of the layout code illustrated in FIG. 5 are represented as the number of pixels, the width and height may be represented by a metric system, or may be represented by a ratio of a horizontal length to a vertical length of a screen.

Figure 6:
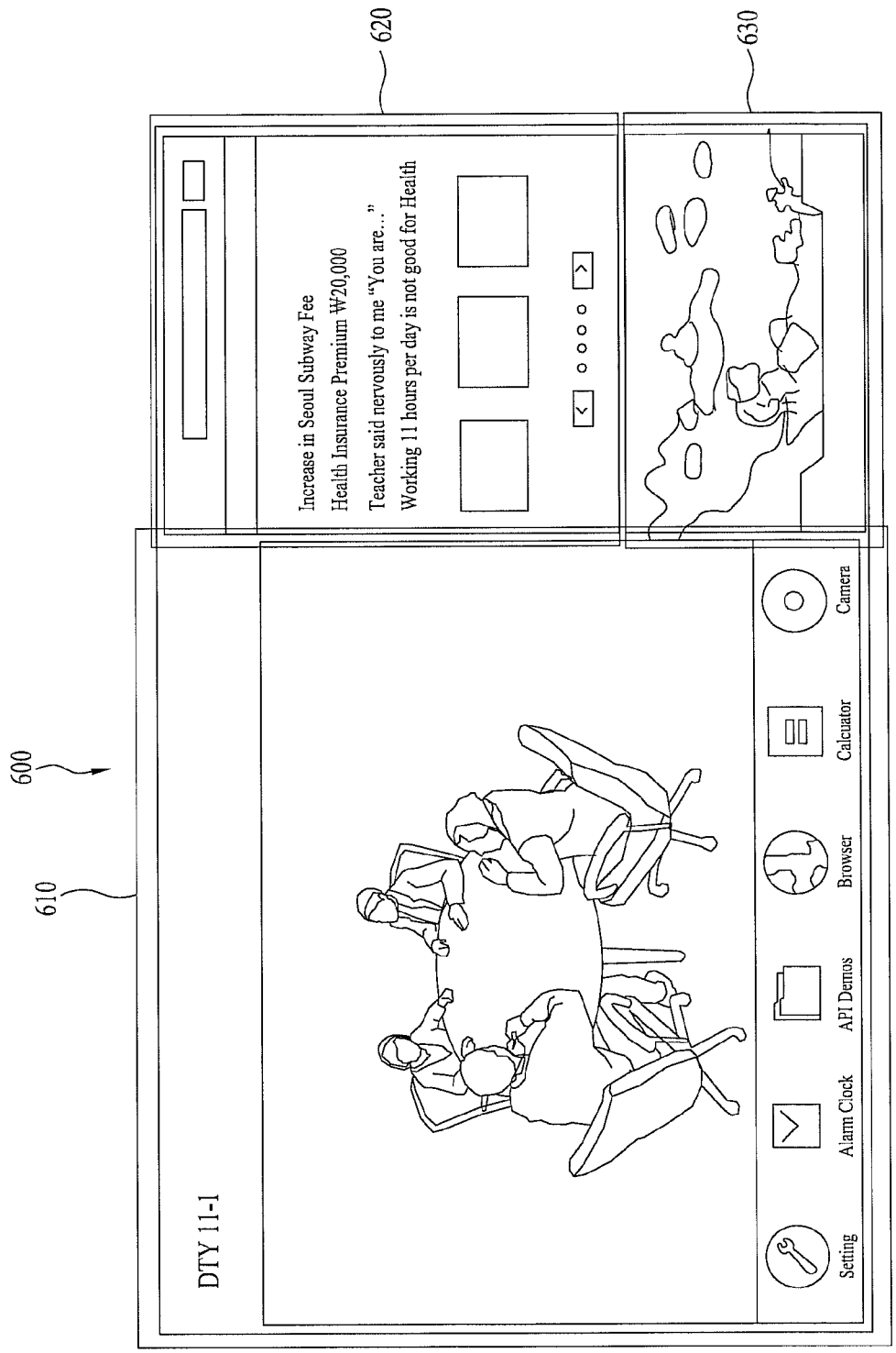
FIG. 6 is a view illustrating windows displayed on regions as defined in the exemplary embodiments of FIG. 5.

FIG. 6 is a view illustrating windows displayed on regions as defined in the exemplary embodiments of FIG. 5.

Referring to FIG. 6, the controller 190 may check a layout code of an application upon execution of the application and control display of a window, which displays an execution screen of the application, at a position indicated by the checked layout code. That is to say, a window may be displayed at a position indicated by a layout code.

If the resolution of a screen and the reference resolution of the layout code are equal to each other, the controller 190 may control the window so as to be displayed at a position indicated by the layout code. If they are not equal to each other, the controller 190 may adjust the position indicated by the layout code according to a ratio of the resolution of the screen to the reference resolution of the layout code and control the window so as to be displayed at the adjusted position. That is to say, if the resolution of a screen and the reference resolution of a layout code are not equal to each other, the controller 190 may adjust the position indicated by the layout code relative to the screen.

A screen 600 has a resolution of 1920×1080. Thus, the resolution of the screen 600 is equal to the reference resolution of the layout code illustrated in FIG. 5. The display 150 may display the window by the name of 'broadcast' on a region 610 indicated by a layout code 510, the window by the name of 'browser' on a region 620 indicated by a layout code 520 and the window by the name of 'came' on a region 630 indicated by a layout code 530.

FIG. 7 is a view illustrating another exemplary embodiment of a code of an application that defines a window layout.

Referring to FIG. 7, a single application may be executed by a plurality of processes, and execution screens of the plurality of processes may be respectively displayed on individual windows. A layout code may indicate the number of windows that display the execution screens of the processes and positions of the respective windows. That is to say, the designer may define how many windows can be laid out in a layout code in the design stage of an application.

In the embodiment of FIG. 7, the layout code is defined in XML. Alternatively, the layout code may be defined in other programming languages.

"Number of windows" refers to the number of windows which display execution screens of an application. Here, 'Number of windows' is 3 and thus, three windows may be displayed.

'Name' refers to a name of the window, 'x_pos' and 'y_pos' refer to horizontal and vertical coordinates of a display position of the window, 'width' refers to a horizontal length of the window, and 'height' refers to a vertical length of the window. A reference resolution of the layout code illustrated in FIG. 6 is 1920×1080.

A window by the name of 'browser 1' is displayed at a position indicated by coordinates (1, 1) and has a width of 1280 pixels and a height of 1080 pixels.

A window by the name of 'browser 2' is displayed at a position indicated by coordinates (1281, 1) and has a width of 640 pixels and a height of 810 pixels.

A window by the name of 'browser 3' is displayed at a position indicated by coordinates (1281, 811) and has a width of 640 pixels and a height of 270 pixels.

Although the width and height of the layout code illustrated in FIG. 7 are represented by the number of pixels, the width and height may be represented by a metric system, or may be represented by a ratio of a horizontal length to a vertical length of a screen.

Figure 8:
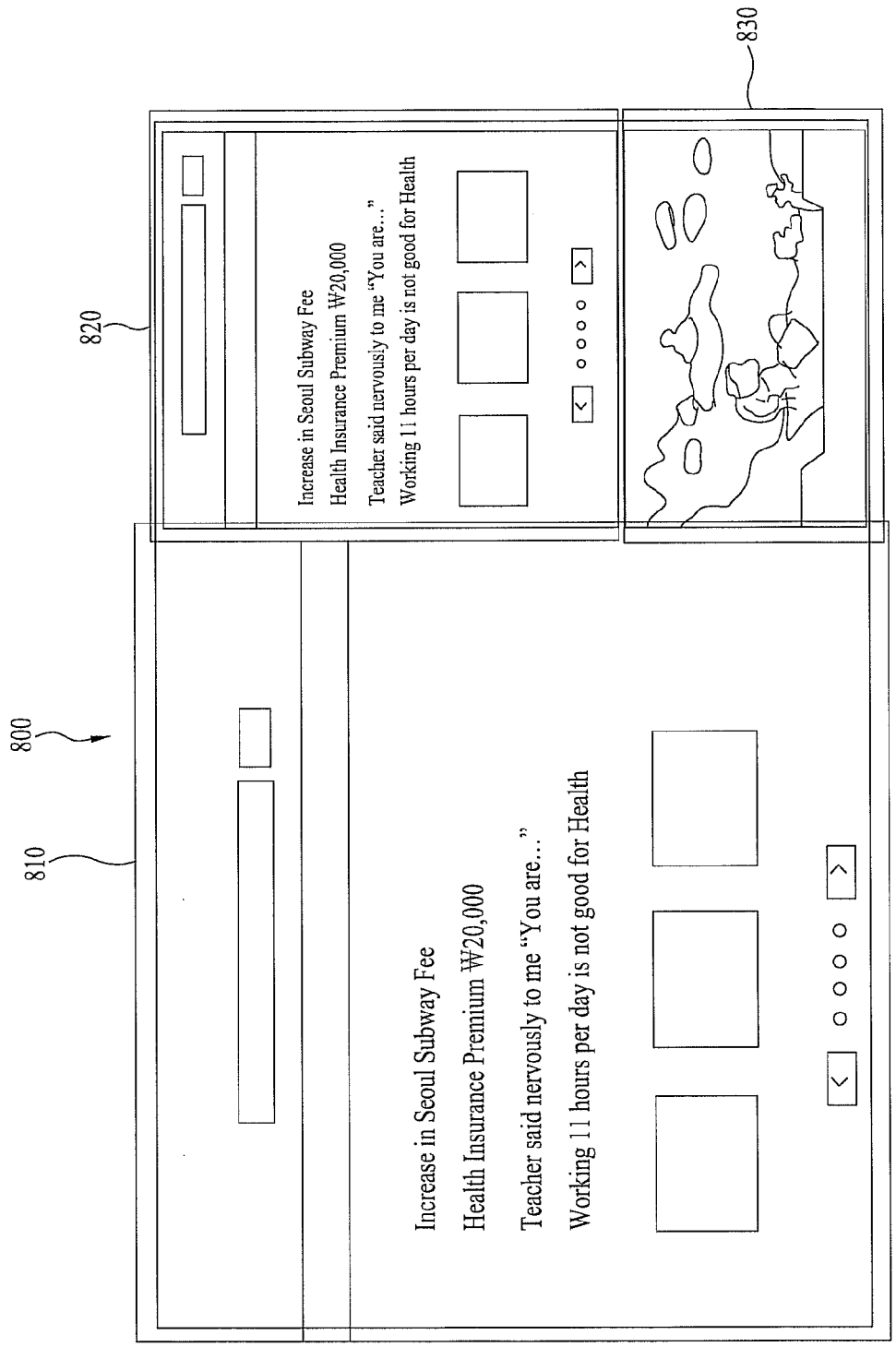
FIG. 8 is a view illustrating windows displayed on regions as defined in the exemplary embodiment of FIG. 7.

FIG. 8 is a view illustrating windows displayed on regions as defined in the exemplary embodiment of FIG. 7.

Referring to FIG. 8, the controller 190 first executes a browser application and controls the window by the name of 'browser 1', which is a window for displaying an execution screen of the firstly executed browser application, so as to be displayed on a region 810 indicated by a layout code 710. Then, the controller 190 secondly executes the browser application and controls the window by the name of 'browser 2', which is a window for displaying an execution screen of the secondly executed browser application, so as to be displayed on a region 820 indicated by a layout code 720. Also, the controller 190 thirdly executes the browser application and controls the window by the name of 'browser 3', which is a window for displaying an execution screen of the thirdly executed browser application, so as to be displayed on a region 830 indicated by a layout code 730.

A screen 800 displays a window 810 by the name of 'browser 1', a window 820 by the name of 'browser 2' and a window 830 by the name of 'browser 3'. The window 810 by the name of 'browser 1' may be a main window, and the window 820 by the name of 'browser 2' and the window 830 by the name of 'browser 3' may be sub windows.

Figures 9, 10:
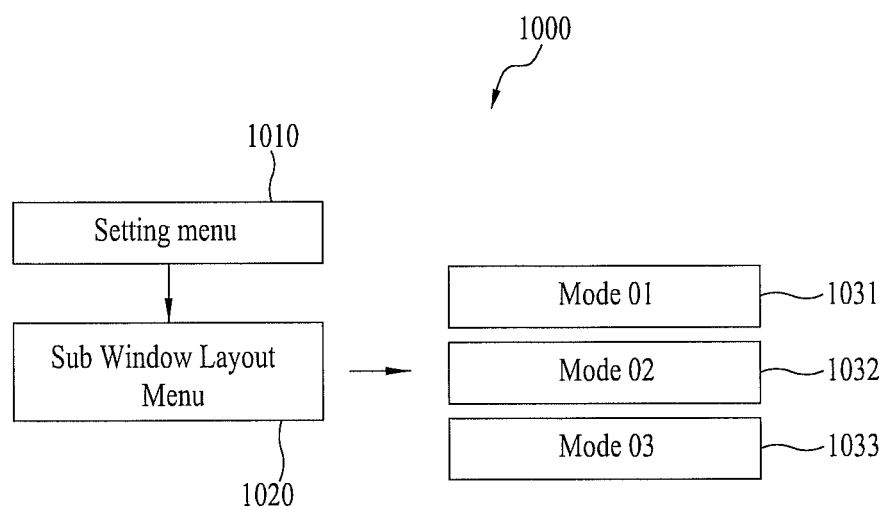
FIG. 9 is a view illustrating a further exemplary embodiment of a code of an application that defines a window layout.
FIG. 10 is a view illustrating an exemplary embodiment of a menu for setting a window layout mode.

FIG. 9 is a view illustrating a further exemplary embodiment of a code of an application that defines a window layout.

A layout code may indicate a plurality of positions where a target window will be displayed and may check whether or not an additional window is present at a first position among the plurality of positions. If another window is present at the first position, the target window may be defined so as to be displayed at a second position among the plurality of positions. If another window is not present at the first position, the target window may be defined so as to be displayed at the first position among the plurality of positions.

In the layout code of FIG. 9, the first position is represented by coordinates (1, 1) and the second position is represented by coordinates (1281, 1). The controller 190 checks whether or not a window is present at the first position. If a window is not present at the first position, the controller 190 implements a first "if" paragraph 910 to control the window by the name of 'browser' so as to be displayed at the position (1, 1). If a window is present at the first position, the controller 190 implements a second "if" paragraph 920 to control the window by the name of 'browser' so as to be displayed at the position (1281, 1).

The display device 10 in accordance with the present invention may predesignate the layout of windows and may display the windows without a risk of overlap or collision thereof. As such, the user may execute an application without hindering broadcast viewing.

FIG. 10 is a view illustrating an exemplary embodiment of a menu for setting a window layout mode.

Referring to FIG. 10, the controller 190 may control display of a menu 1000 on a screen. In a state in which the display 150 displays a setting menu item 1010 on the screen, if a user action of selecting the setting menu item 1010 is detected, the controller 190 may control display of a sub window layout menu item 1020 on the screen in response to the detected user action.

In a state in which the display 150 displays the sub window layout menu item 1020 on the screen, if a user action of selecting the sub window layout menu item 1020 is detected, the controller 190 may control display of a mode 01 menu item 1031, a mode 02 menu item 1032 and a mode 03 menu item 1033 on the screen in response to the detected user action. The mode 01 menu item 1031, the mode 02 menu item 1032 and the mode 03 menu item 1033 may respectively indicate window layout modes. That is to say, the user may perform a user action of selecting one of the mode 01 menu item 1031, the mode 02 menu item 1032 and the mode 03 menu item 1033, such that a window layout mode indicated by the selected menu item may be set to a desired window layout mode.

Although FIG. 10 exemplifies three menu items indicating the window layout modes, the present invention is not limited thereto and a plurality of menu items may be provided according to embodiments.

Figure 11:
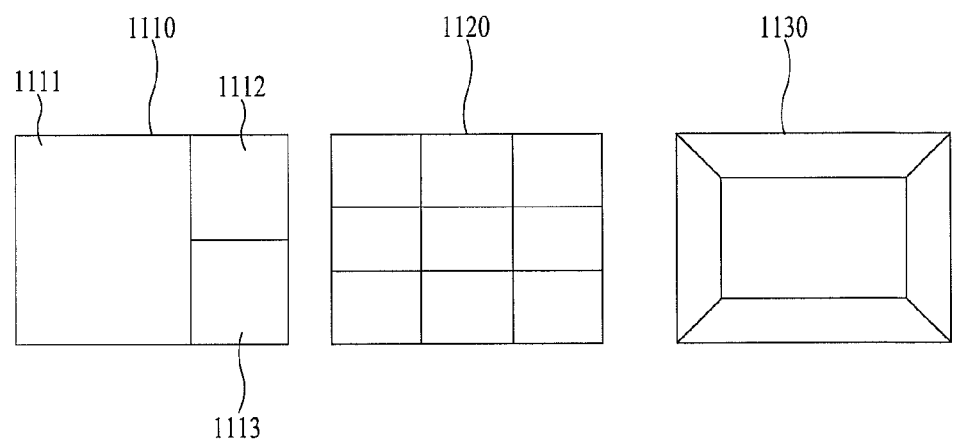
FIG. 11 is a view illustrating exemplary embodiments of a window layout configuration indicated by a window layout mode.

FIG. 11 is a view illustrating exemplary embodiments of a window layout configuration indicated by a window layout mode.

Referring to FIG. 11, a window layout mode may be one of a window layout mode 1110, a window layout mode 1120 and a window layout mode 1130. The mode 01 menu item 1031, the mode 02 menu item 1032 and the mode 03 menu item 1033 may be associated with the window layout mode 1110, the window layout mode 1120 and the window layout mode 1130 respectively.

If the user selects the mode 01 menu item 1031, the controller 190 may control windows so as to be displayed on a screen according to a configuration indicated by the window layout mode 1110. For example, the controller 190 may execute a first application and control a main window, which displays an execution screen of the executed first application, so as to be displayed on a region 1111. Then, the controller 190 may execute a second application and control a first sub window, which displays an execution screen of the executed second application, so as to be displayed on a region 1112. Thereafter, the controller 190 may execute a third application and control a second sub window, which displays an execution screen of the executed third application, so as to be displayed on a region 1113.

Figure 12:
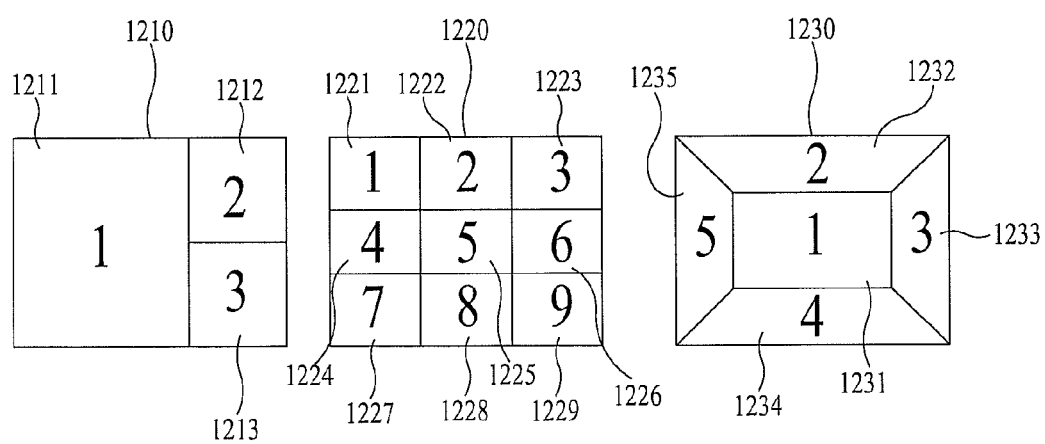
FIG. 12 is a view illustrating an exemplary embodiment of the sequence in which windows are displayed based on a window layout configuration indicated by a window layout mode.

FIG. 12 is a view illustrating an exemplary embodiment of the sequence in which windows are displayed based on a window layout configuration indicated by a window layout mode.

Referring to FIG. 12, a window layout mode 1210, a window layout mode 1220 and a window layout mode 1230 may contain information on the sequence in which windows are displayed. The sequence information may be numerals represented on respective regions. The window layout mode 1210 may display windows in the sequence of a region 1211, a region 1212 and a region 1213. The window layout mode 1220 may display windows in the sequence of a region 1221, a region 1222, a region 1223, a region 1224, a region 1225, a region 1226, a region 1227, a region 1228 and a region 1229. Also, the window layout mode 1230 may display windows in the sequence of a region 1231, a region 1232, a region 1233, a region 1234 and a region 1235.

Figure 13:
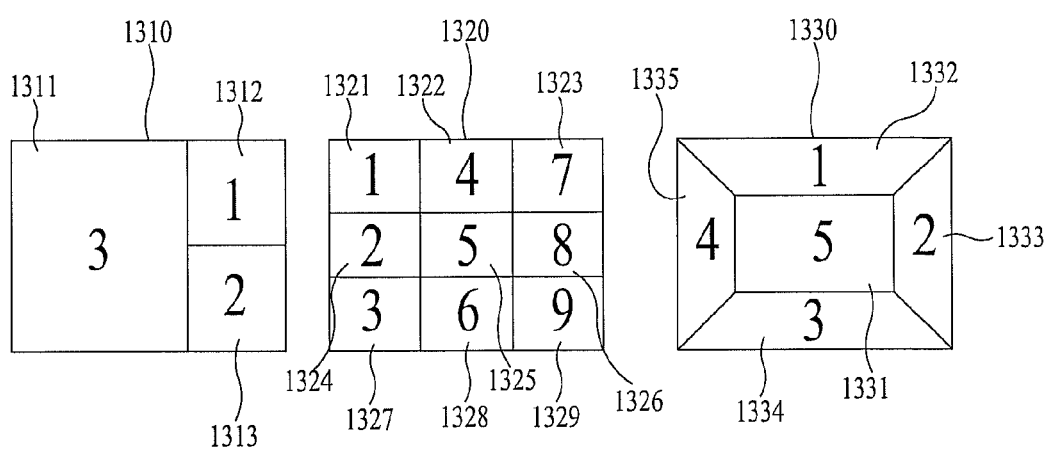
FIG. 13 is a view illustrating an exemplary embodiment of the display sequence changed from that illustrated in FIG. 12.

FIG. 13 is a view illustrating an exemplary embodiment of the display sequence changed from that illustrated in FIG. 12.

Referring to FIG. 13, the display sequence of windows according to the window layout mode 1210, the window layout mode 1220 and the window layout mode 1230 illustrated in FIG. 12 may be changed to the sequence of a window layout mode 1310, a window layout mode 1320 and a window layout mode 1330.

In the case in which a window layout configuration indicated by a selected window layout mode is displayed on a screen, the user may perform a user action of moving an indicator to select corresponding regions, which allows the display sequence of windows to be changed according to the selected sequence. For example, in the window layout mode 1210 illustrated in FIG. 12, if the user performs a user action of moving an indicator to select a region 1312, a region 1313 and a region 1311 in this sequence, the controller 190 may change sequence information from the window layout mode 1210 to a window layout mode 1310. Thereby, the controller 190 may control display of windows in the sequence of the region 1312, the region 1313 and the region 1311 according to the window layout mode 1310.

Figure 14:
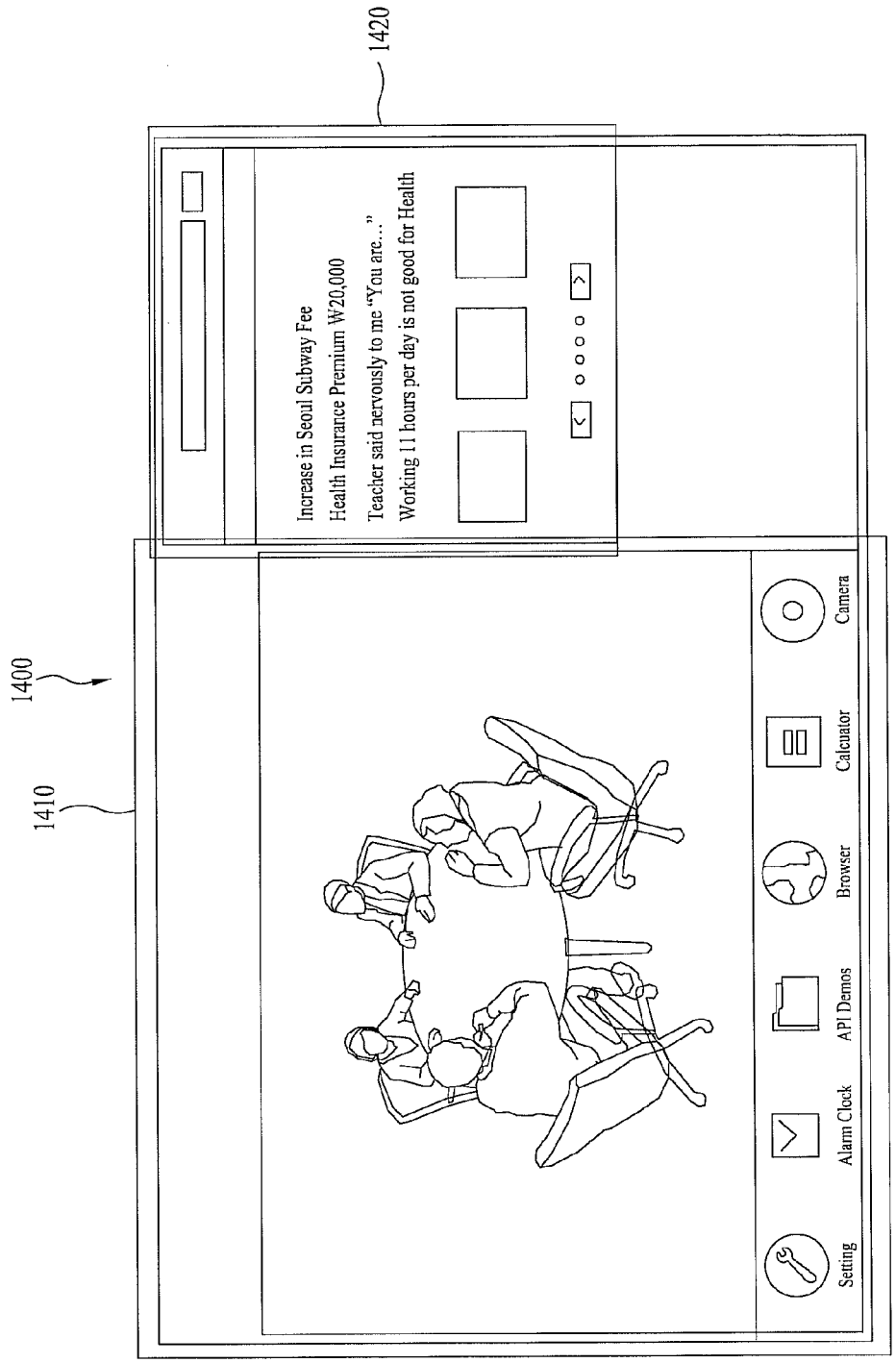
FIG. 14 is a view illustrating a screen on which a new application is additionally executed in a state in which a plurality of windows has been displayed on the screen.

FIG. 14 is a view illustrating a screen on which a new application is additionally executed in a state in which a plurality of windows has been displayed on the screen.

Referring to FIG. 14, if a browser application is executed in a state in which a main window 1410 has been displayed, the controller 190 may control display of a sub window, which displays an execution screen of the browser application, on a region 1420 of a screen 1400.

When the sub window 1420 is displayed, the sub window 1420 may become a focusing window. That is to say, when the sub window 1420 is displayed, a focusing window may be automatically changed from the main window 1410 to the sub window 1420.

If a coupling signal from the remote controller 30 is transmitted in a state in which the sub window 1420 is focused, the remote controller 30 may be coupled with a browser application that is an application associated with the sub window 1420. Thereby, the user may control the browser application using the remote controller 30 without separate focus switching.

Figure 15:
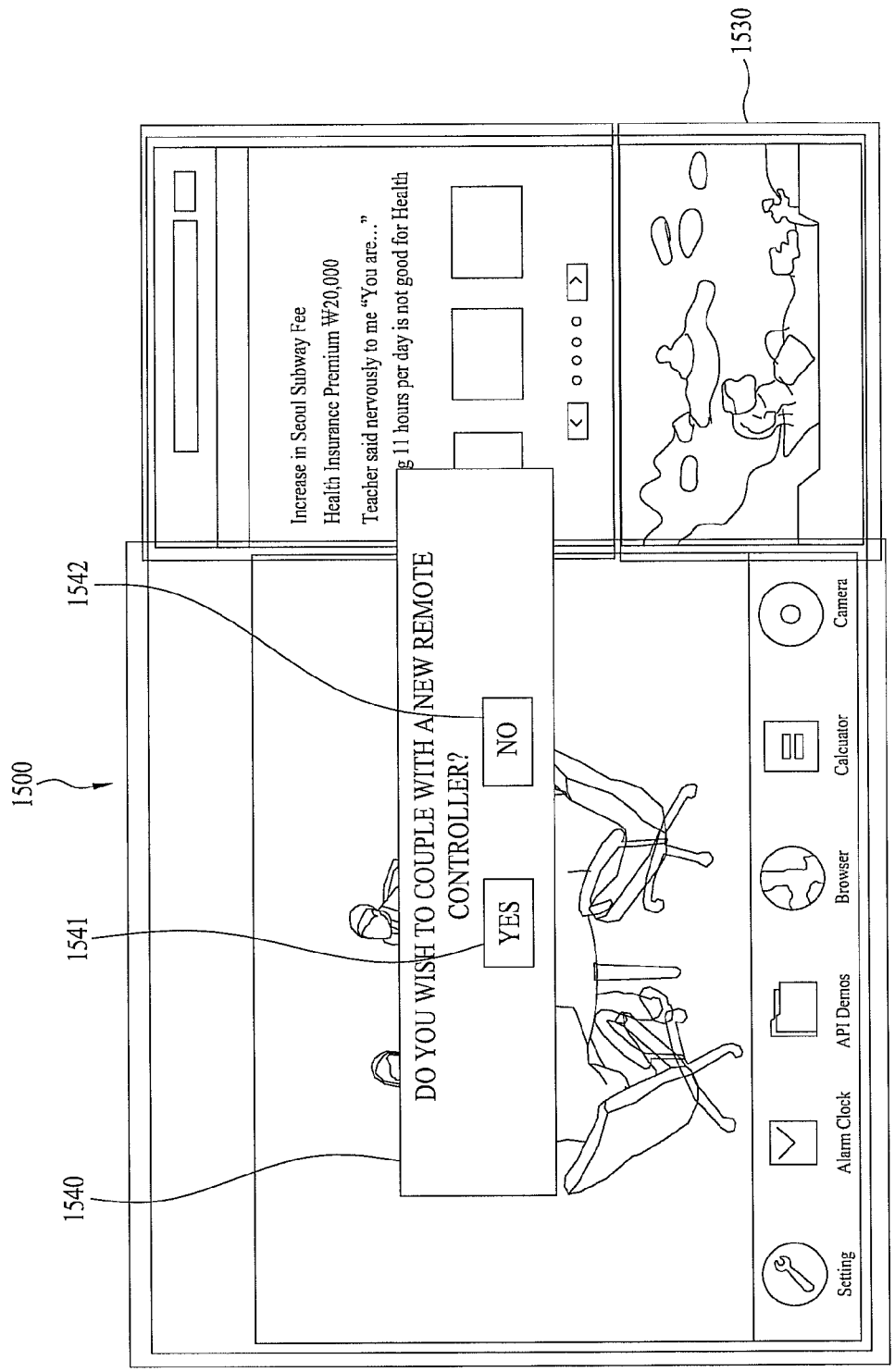
FIG. 15 is a view illustrating an exemplary embodiment of a screen on which a coupling execution checking message is displayed.

FIG. 15 is a view illustrating an exemplary embodiment of a screen on which a coupling execution checking message is displayed.

Referring to FIG. 15, when a new window 1530 is displayed, a coupling execution checking message 1540 may be displayed on a screen 1500. The coupling execution checking message 1540 may indicate whether or not to execute coupling with a new remote controller. If the user performs a user action of selecting a button 1541, the controller 190 may detect an approval signal. If the user performs a user action of selecting a button 1542, the controller 190 may detect a refusal signal.

Figure 16:
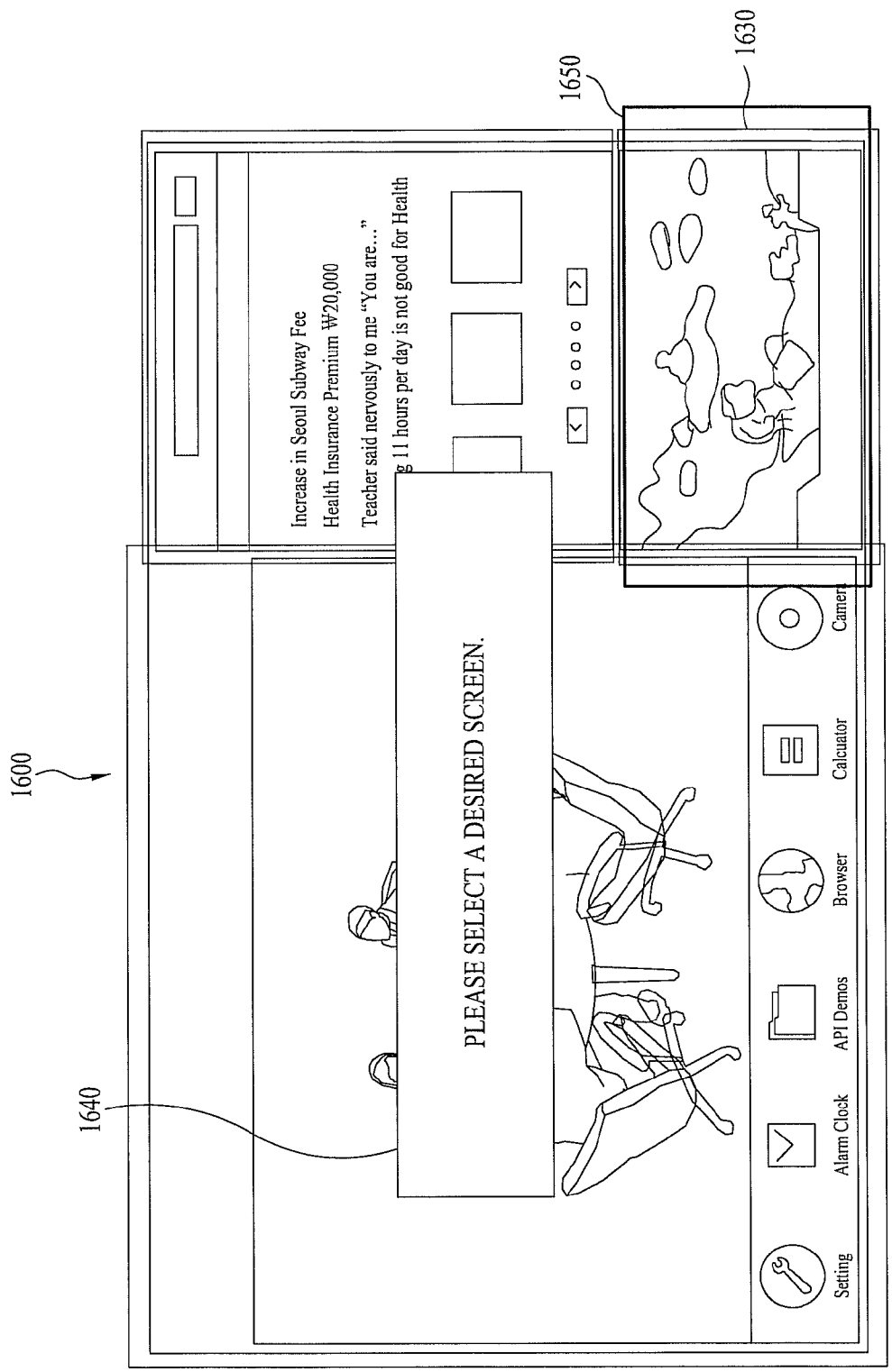
FIG. 16 is a view illustrating one exemplary embodiment of a screen on which a coupling execution guide message is displayed.

FIG. 16 is a view illustrating one exemplary embodiment of a screen on which a coupling execution guide message is displayed.

Referring to FIG. 16, if the approval signal is detected in response to the coupling execution checking message 1540, the controller 190 may display a coupling execution guide message 1640 in response to the approval signal.

The coupling execution guide message 1640 may indicate selection of a window that will be coupled with a new remote controller. The user may switch a focusing window using the main remote controller 20. If a focus switching signal is transmitted from the main remote controller 20, the controller 190 switches the focused window.

In addition, a mark 1650 to indicate the focused window may be displayed on a screen 1600. The user may recognize, based on the mark 1650, that a window 1630 is the focused window on the screen 1600.

Figure 17:
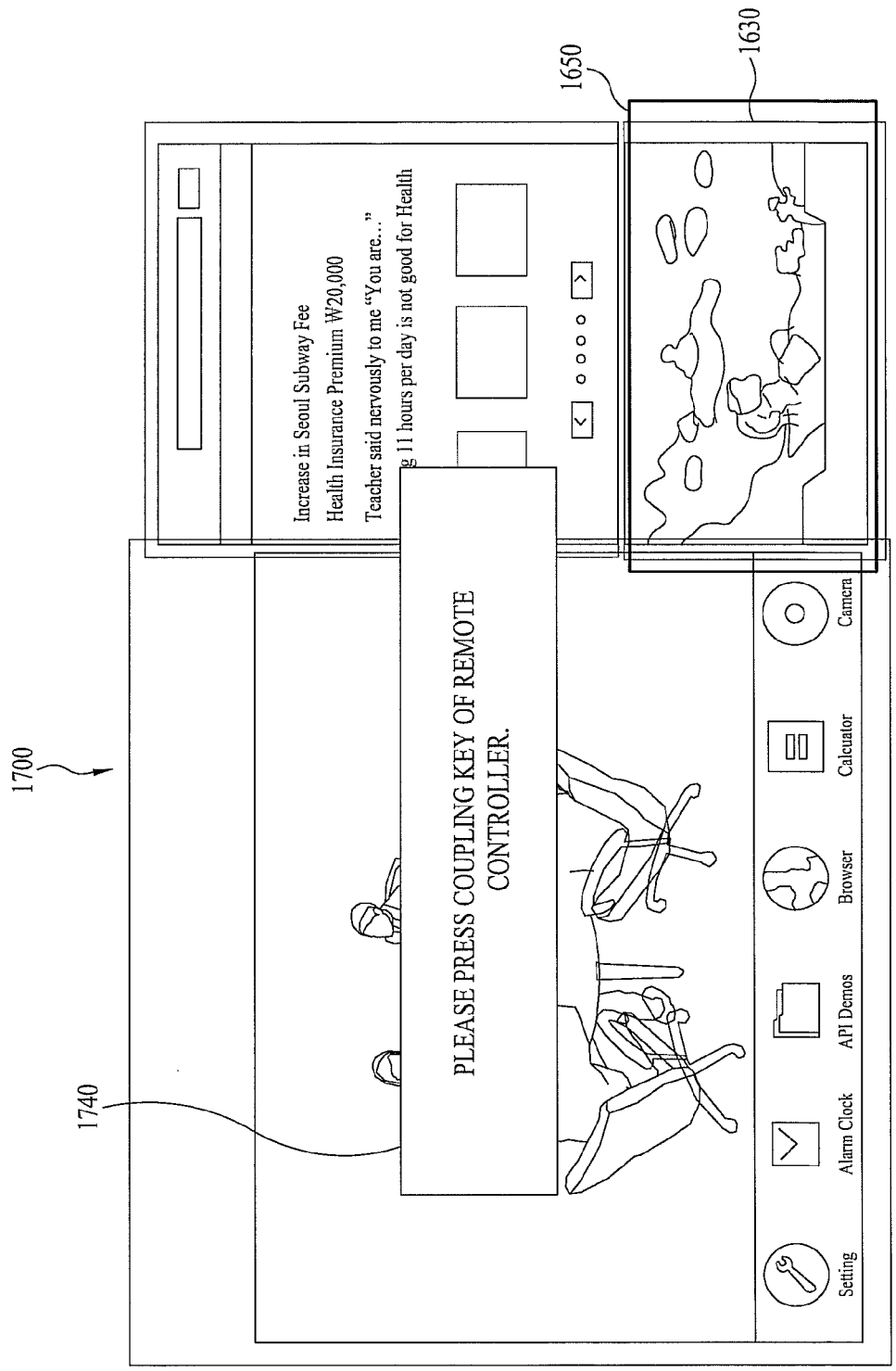
FIG. 17 is a view illustrating another exemplary embodiment of a screen on which a coupling execution guide message is displayed.

FIG. 17 is a view illustrating another exemplary embodiment of a screen on which a coupling execution guide message is displayed.

Referring to FIG. 17, a coupling execution guide message 1740 may be displayed on a screen 1700. The coupling execution guide message 1740 may be displayed after a predetermined time has passed after the coupling execution guide message 1640 began to be displayed, or may be displayed after a predetermined time has passed after a focus change signal was received.

The coupling execution guide message 1740 may indicate pressing a coupling key of a remote controller to be coupled with. The user may perform a user action of pressing a coupling key of a new remote controller in response to the coupling execution guide message 1740. The new remote controller may transmit a coupling signal to the display device 10 in response to the user action.

The input unit 170 receives the transmitted coupling signal. The controller 190 implements coupling between the remote controller that transmits the coupling signal and an application associated with the focused window 1630 in FIG. 16 in response to the received coupling signal.

Figure 18:
FIG. 18 is a view illustrating an exemplary embodiment of a coupling table.

FIG. 18 is a view illustrating an exemplary embodiment of a coupling table.

Referring to FIG. 18, the controller 190 may associate an identifier of an application to be coupled with and an identifier contained in a coupling signal to each other and then, may store the associated identifiers in a coupling table 1800. The identifier of the application may be a Process ID (PID).

In some embodiments, the controller 190 transmits an identifier contained in a coupling signal to an application to be coupled with. The application to be coupled with may store the transmitted identifier in a storage area assigned thereto.

Figure 19:
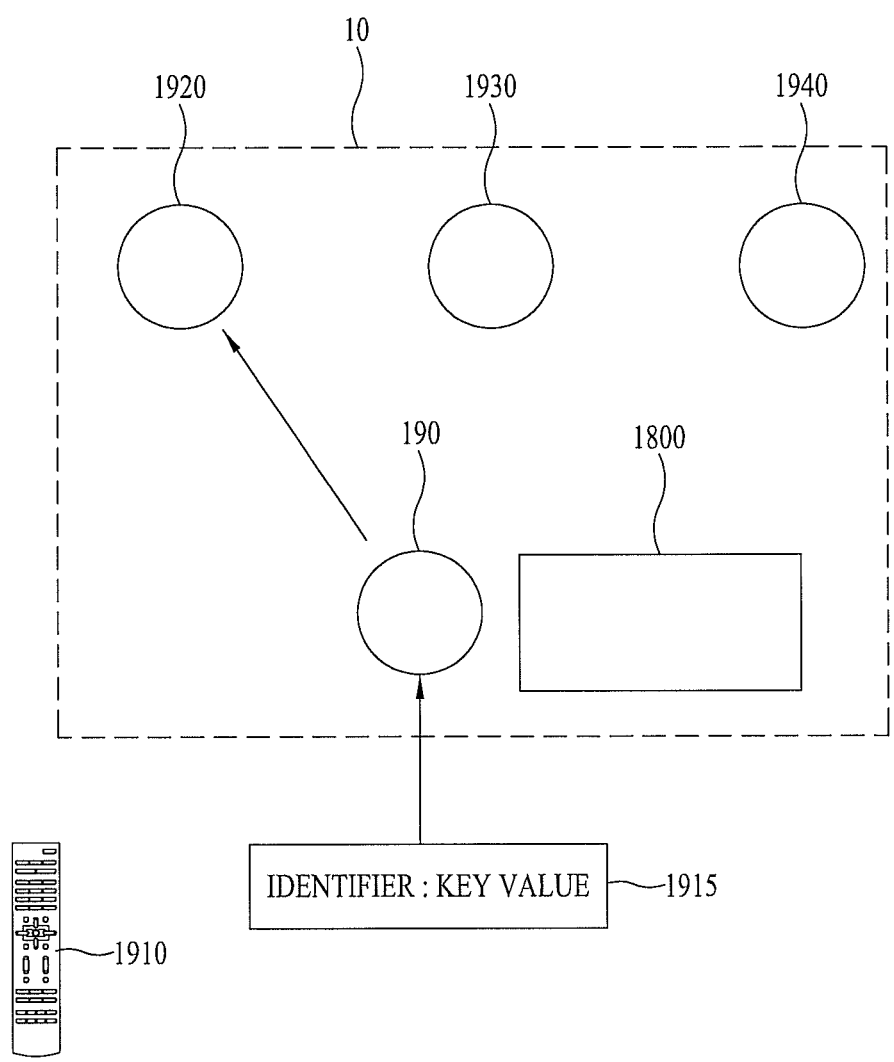
FIG. 19 is a view illustrating one exemplary embodiment of a method for processing a command signal.

FIG. 19 is a view illustrating one exemplary embodiment of a method for processing a command signal.

Referring to FIG. 19, the display device 10 executes a plurality of applications 1920, 1930 and 1940 and displays windows, which respectively display execution screens of the plurality of applications 1920, 1930 and 1940, on a screen.

A remote controller 1910 transmits a command signal 1915 to the display device 10. The command signal 1915 may contain an identifier of the remote controller 1910 and a key value that indicates a command or operation of the display device 10. The command signal 1915 may be the remote controller transmission signal 200 illustrated in FIG. 2.

The controller 190 searches for an identifier of an application associated with the identifier contained in the transmitted command signal 1915. Then, the controller 190 may transmit the command signal 1915 to the searched application having the associated identifier, e.g., the application 1920. The command signal 1915 transmitted to the application 1920 may be an event.

In some embodiments, the controller 190 may transmit a key value of the command signal 1915 to the application 1920. The key value transmitted to the application 1920 may be an event.

Figure 20:
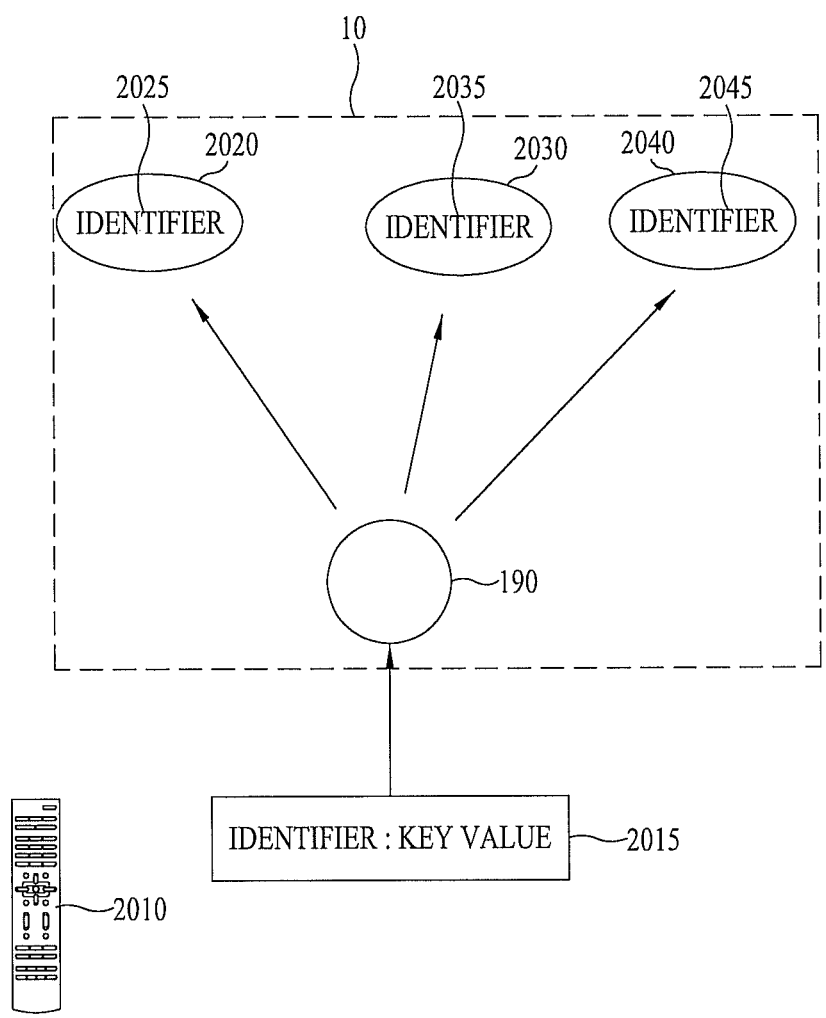
FIG. 20 is a view illustrating another exemplary embodiment of a method for processing a command signal.

FIG. 20 is a view illustrating another exemplary embodiment of a method for processing a command signal.

Referring to FIG. 20, the display device 10 executes a plurality of applications 2020, 2030 and 2040 and displays windows, which respectively display execution screens of the plurality of applications 2020, 2030 and 2040, on a screen.

A remote controller 2010 transmits a command signal 2015 to the display device 10. The command signal 2015 may contain an identifier of the remote controller 2010 and a key value that indicates a command or operation of the display device 10. The command signal 2015 may be the remote controller transmission signal 200 illustrated in FIG. 2.

The controller 190 may transmit the command signal 2015 to the application 2020, the application 2030 and the application 2040 in response to the transmitted command signal 2015. The command signal 2015 may be transmitted, as an event, to the applications.

The application 2020 checks whether or not the identifier contained in the command signal 2015 is equal to an identifier 2025 stored in a storage area assigned to the application 2020. If they are not equal, the application 2020 disuses the command signal 2015. If they are equal, the application 2020 implements a command or operation indicated by the key value contained in the command signal 2015.

The application 2030 checks whether or not the identifier contained in the command signal 2015 is equal to an identifier 2035 stored in a storage area assigned to the application 2030. If they are not equal, the application 2030 disuses the command signal 2015. If they are equal, the application 2030 implements a command or operation indicated by the key value contained in the command signal 2015.

The application 2040 checks whether or not the identifier contained in the command signal 2015 is equal to an identifier 2045 stored in a storage area assigned to the application 2040. If they are not equal, the application 2040 disuses the command signal 2015. If they are equal, the application 2040 implements a command or operation indicated by the key value contained in the command signal 2015.

Figure 21:
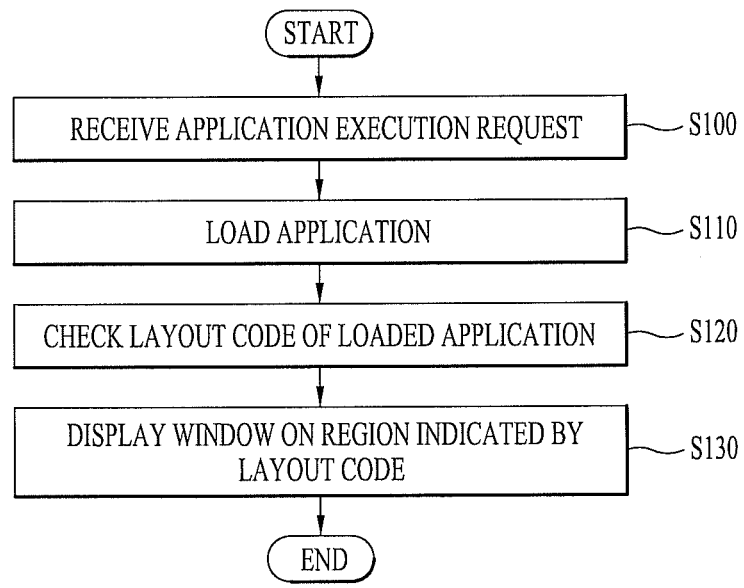
FIG. 21 is a flowchart illustrating the implementation procedure of a window display method in accordance with one exemplary embodiment of the present invention.

FIG. 21 is a flowchart illustrating the implementation procedure of a window display method in accordance with one exemplary embodiment of the present invention.

Referring to FIG. 21, the input unit 170 receives an application execution request (S100).

The controller 190 loads a requested application (S110). Here, a process with respect to the requested application is produced and process information on the produced process is stored in a Process Control Block (PCB).

The controller 190 checks a layout code of the loaded application (S120). The controller 190 may execute the layout code to thereby check a region indicated by the layout code. The layout code may be any one of the layout codes illustrated in FIGS. 5, 7 and 9.

The controller 190 displays a window, which displays an execution screen of the application loaded in operation 5120 (S130).

Figure 22:
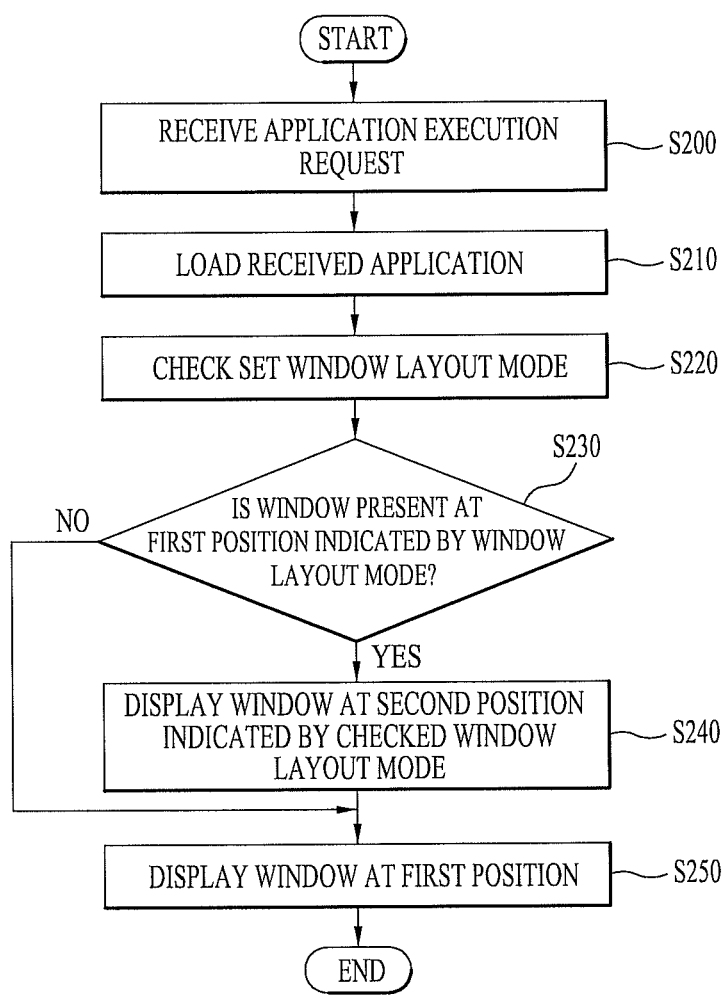
FIG. 22 is a flowchart illustrating the implementation procedure of a window display method in accordance with another exemplary embodiment of the present invention.

FIG. 22 is a flowchart illustrating the implementation procedure of a window display method in accordance with another exemplary embodiment of the present invention.

Referring to FIG. 22, the input unit 170 receives an application execution request (S200).

The controller 190 loads a requested application (S210). Here, a process with respect to the requested application is produced and process information on the produced process is stored in a Process Control Block (PCB).

The controller 190 checks a set window layout mode (S220). The window layout mode may be set via the menu illustrated in FIG. 10. Additionally, the window layout mode may be any one of the window layout modes 1110, 1120 and 1130 illustrated in FIG. 11.

The controller 190 may check whether or not a window is present at a first position indicated by the set window layout mode (S230). The first position may be determined based on sequence information contained in the window layout mode.

If the window is present at the first position, the controller 190 controls display of a window, which displays an execution screen of the loaded application, at a second position indicated by the set window layout mode (S240). The controller 190 further checks whether or not a window is present at the second position. If the window is present at the second position, the controller 190 controls display of a window, which displays the execution screen of the loaded application, at a third position indicated by the set window layout mode.

If a window is not present at the first position, the controller 190 controls display of a window, which displays the execution screen of the application, at the first position (S250).

Figure 23:
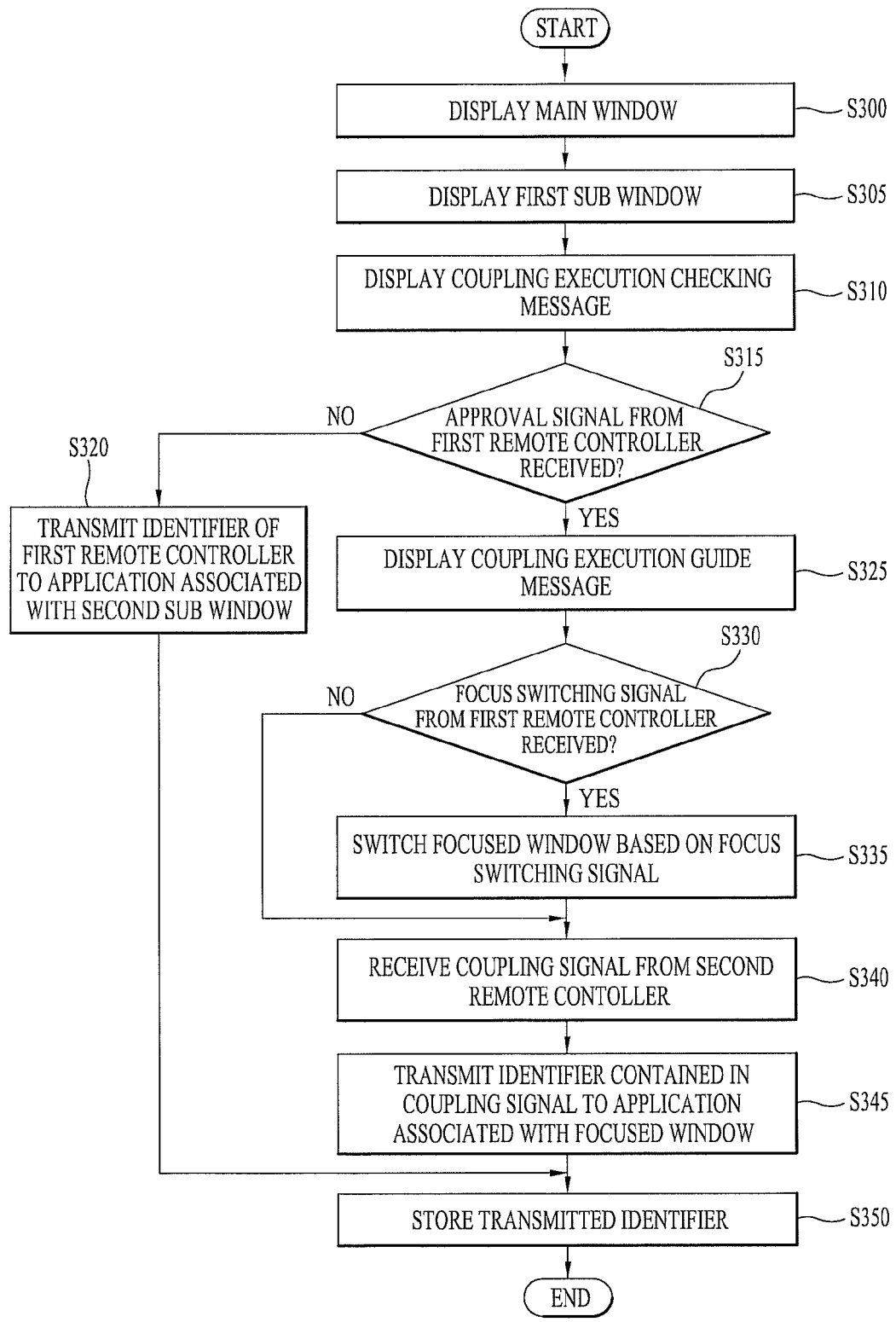
FIG. 23 is a flowchart illustrating the implementation procedure of a window coupling method in accordance with one exemplary embodiment of the present invention.

FIG. 23 is a flowchart illustrating the implementation procedure of a window coupling method in accordance with one exemplary embodiment of the present invention.

Referring to FIG. 23, the display 150 displays a main window (S300).

Then, the display 150 displays a first sub window (S305). The first sub window may be displayed by the window display method as described above in relation to FIG. 21, or the window display method as described above in relation to FIG. 22.

The display 150 displays a coupling execution checking message (S310). The message may be the message 1540 illustrated in FIG. 15.

The controller 190 checks whether or not an approval signal is received from a first remote controller (S315). The controller 190 may receive a refusal signal from the first remote controller. The first remote controller may be a main remote controller.

If the approval signal is not received, the controller 190 transmits an identifier of the first remote controller to an application associated with a second sub window (S320).

If the approval signal is received, the display 150 displays a coupling execution guide message (S325). The message may be a message 1640 illustrated in FIG. 16, or may be the message 1740 illustrated in FIG. 17.

The controller 190 checks whether or not a focus switching signal is received from the first remote controller (S330).

If the focus switching signal is received, the controller 190 switches a focused window based on the focus switching signal (S335). If a preset time has passed after the focus switching signal was received, the display 150 may display the message 1740 illustrated in FIG. 17.

The input unit 170 receives a coupling signal from a second remote controller (S340). In some embodiments, the receiver 101 may receive the coupling signal.

The controller 190 transmits an identifier contained in the coupling signal to an application associated with the focused window in response to the received coupling signal (S345).

The application, to the identifier of the coupling signal is transmitted, stores the identifier in a storage area assigned thereto (S350).

Figure 24:
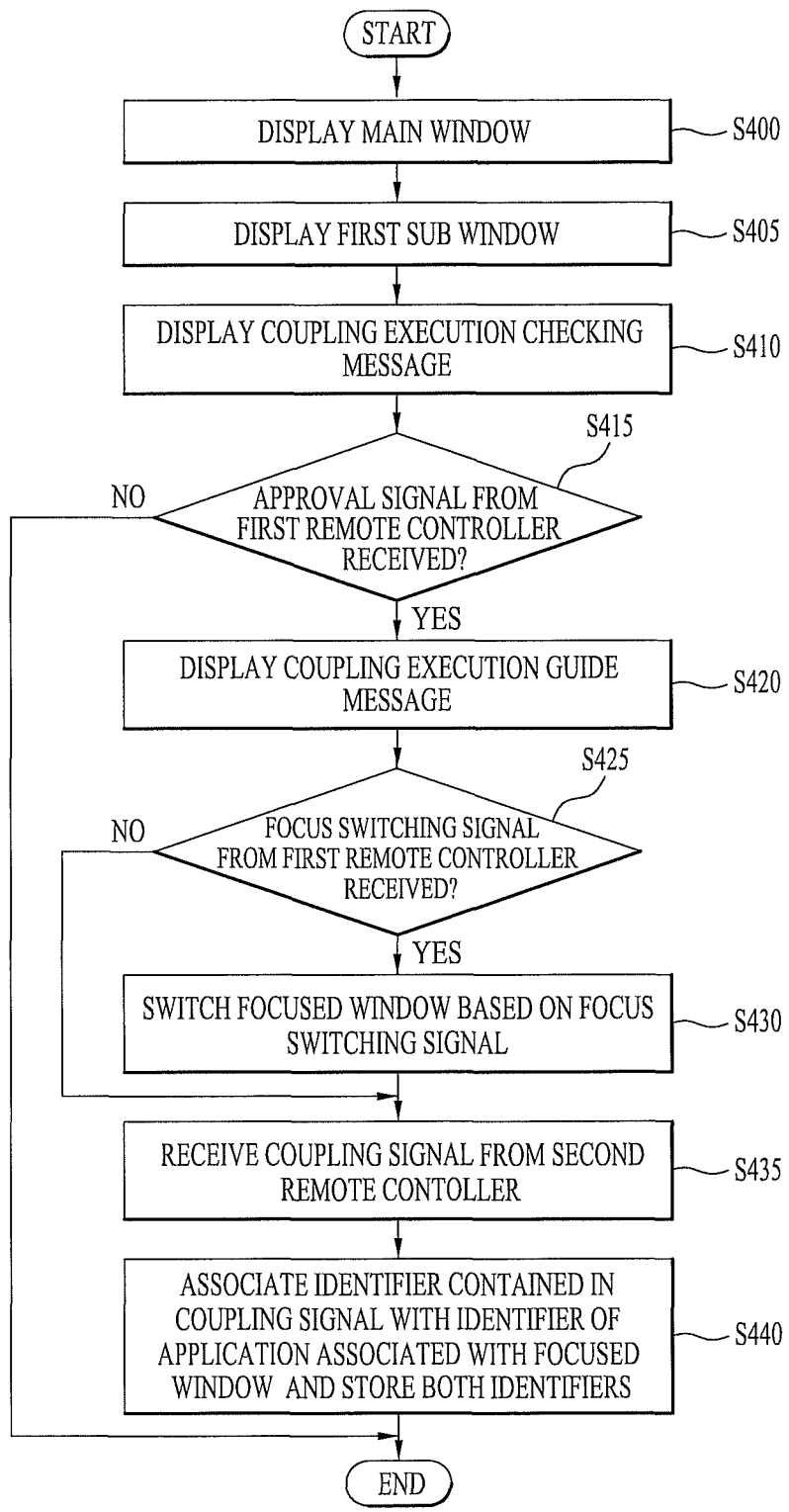
FIG. 24 is a flowchart illustrating the implementation procedure of a window coupling method in accordance with another exemplary embodiment of the present invention.

FIG. 24 is a flowchart illustrating the implementation procedure of a window coupling method in accordance with another exemplary embodiment of the present invention.

Referring to FIG. 24, the display 150 displays a main window (S400).

The display 150 displays a first sub window (S405). The first sub window may be displayed by the window display method as described above in relation to FIG. 21, or the window display method as described above in relation to FIG. 22.

The display 150 displays a coupling execution checking message (S410). The message may be the message 1540 illustrated in FIG. 15.

The controller 190 checks whether or not an approval signal is received from a first remote controller (S415). The controller 190 may receive a refusal signal from the first remote controller. The first remote controller may be a main remote controller.

If the approval signal is received, the display 150 displays a coupling execution guide message (S420). The message may be a message 1640 illustrated in FIG. 16, or may be the message 1740 illustrated in FIG. 17.

The controller 190 checks whether or not a focus switching signal is received from the first remote controller (S425).

If the focus switching signal is received, the controller 190 switches a focused window based on the focus switching signal (S430). If a preset time has passed after the focus switching signal was received, the display 150 may display the message 1740 illustrated in FIG. 17.

The input unit 170 receives a coupling signal from a second remote controller (S435). In some embodiments, the receiver 101 may receive the coupling signal.

The controller 190 associates an identifier contained in the received coupling signal with an identifier of an application that is associated with the focused window stores the associated identifiers in a coupling table (S440). The coupling table may be the coupling table 1800 illustrated in FIG. 18.

Figure 25:
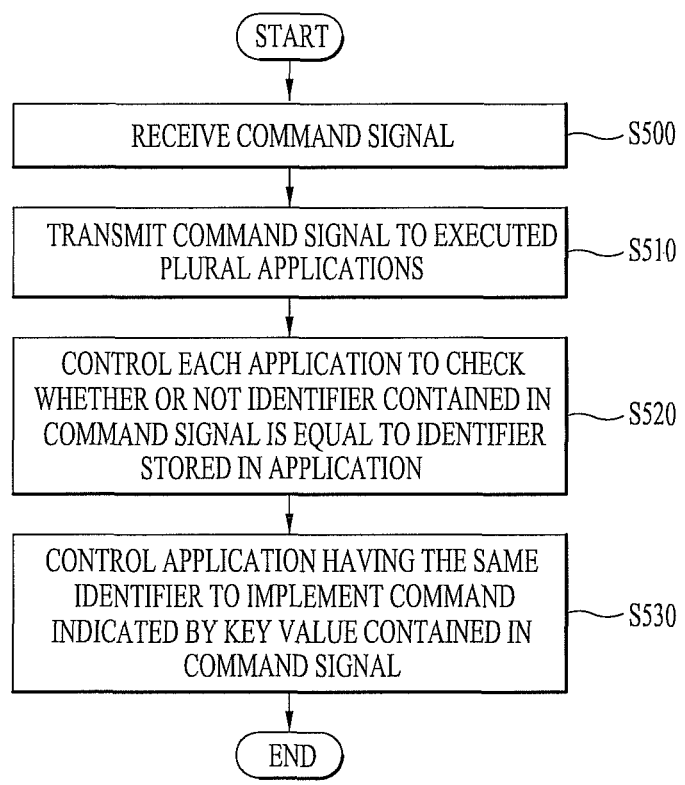
FIG. 25 is a flowchart illustrating the implementation procedure of a remote control method for a display device in accordance with one exemplary embodiment of the present invention.

FIG. 25 is a flowchart illustrating the implementation procedure of a remote control method for a display device in accordance with one exemplary embodiment of the present invention.

Referring to FIG. 25, the input unit 170 receives a command signal from a remote controller (S500). In some embodiments, the receiver 101 may receive the command signal.

The controller 190 transmits the received command signal to executed applications (S510). Here, a plurality of applications may be executed and windows, which respectively display execution screens of the executed applications, may be displayed on a screen. The windows may be displayed by the window display method as described above in relation to FIG. 21, or the window display method as described above in relation to FIG. 22.

Each application checks whether or not an identifier stored therein is equal to an identifier contained in the transmitted command signal (S520). Here, each application is able to check whether or not the identifier stored therein is equal to the identifier contained in the transmitted command signal in a state in which the application is running according to a process schedule. If both the identifiers are not equal, each application may disuse the transmitted command signal. The stored identifier may be stored in a storage area assigned to the application, and may be stored by the window coupling method as described above in relation to FIG. 23.

The controller 190 controls the application having the same identifier as that contained in the command signal such that the application implements a command indicated by a key value contained in the command signal (S530).

Figure 26:
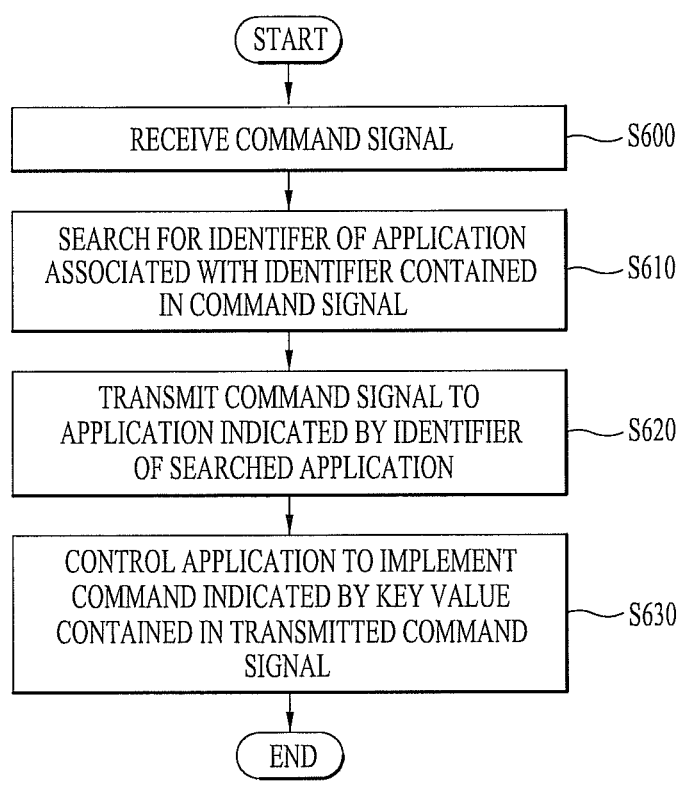
FIG. 26 is a flowchart illustrating the implementation procedure of a remote control method for a display device in accordance with another exemplary embodiment of the present invention.

FIG. 26 is a flowchart illustrating the implementation procedure of a remote control method for a display device in accordance with another exemplary embodiment of the present invention.

Referring to FIG. 26, the input unit 170 receives a command signal from a remote controller (S600). A plurality of applications may be executed in the display device 10, and windows, which respectively display execution screens of the executed applications, may be displayed on a screen. The windows may be displayed by the window display method as described above in relation to FIG. 21, or the window display method as described above in relation to FIG. 22.

In some embodiments, the receiver 101 may receive the coupling signal.

The controller 190 searches for an identifier of an application associated with an identifier contained in the command signal in response to the received command signal from the coupling table 1800 (S610). The coupling table may be the coupling table 1800 illustrated in FIG. 18. The coupling table may store the identifier of the application and the identifier of the remote controller according to the window coupling method as described above in relation to FIG. 24.

The controller 190 transmits the command signal to the searched application having the identifier associated with the identifier contained in the command signal (S620).

The controller 190 controls implementation of a command indicated by a key value contained in the command signal that is transmitted to the searched application (S630).

The present invention may be implemented as code that can be written on a computer-readable recording medium and can thus be read by a computer. The computer-readable recording medium includes all types of recording devices in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer devices connected through a network so that computer-readable code is written thereto and executed therefrom in a decentralized manner.

As is apparent from the above description, through provision of a display device and a method for remotely controlling the display device according to the present invention, a window is displayed at a position defined by a code of an application or is displayed according to a predefined window layout mode, which enables execution of multiple applications without hindering viewing of broadcast programs. Moreover, by providing a function for coupling a new remote controller with a specific application displayed on a screen of the display device, it is possible to allow a plurality of users to control different applications executed by different remote controllers of the respective users.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for remotely controlling a display device, the method comprising:
    displaying a main window, which displays an execution screen of a first application, on a screen of the display device;
    executing a second application and displaying a first sub window, which displays an execution screen of the executed second application, on the screen;
    receiving a signal for changing a focus from a first remote controller, the first remote controller being coupled with the main window;
    switching a focused window based on the received signal;
    receiving a coupling signal containing an identifier from a second remote controller;
    coupling the focused window with the second remote controller in response to the received coupling signal;
    displaying a coupling execution checking message by means of the second remote controller;
    receiving an approval signal from the first remote controller in response to the message; and
    displaying a coupling execution guide message in response to the received approval signal.

2. The method according to claim 1, wherein the coupling includes:
    transmitting the identifier to an application associated with the focused window; and
    controlling the associated application to store the transmitted identifier in a storage area assigned to the application.

3. The method according to claim 2, further comprising:
    receiving a command signal containing an identifier and a key value from one of the first remote controller and the second remote controller;
    transmitting the command signal to the first application and the second application in response to the received command signal;
    controlling the first application to check whether or not the identifier contained in the command signal is equal to an identifier stored in a storage area assigned to the first application and to implement a command indicated by the key value if both the identifiers are equal; and
    controlling the second application to check whether or not the identifier contained in the command signal is equal to an identifier stored in a storage area assigned to the second application and to implement the command indicated by the key value if both the identifiers are equal.

4. The method according to claim 1, wherein the coupling includes associating the identifier with an identifier of the executed second application to store the associated identifiers in a coupling table.

5. The method according to claim 4, further comprising:
    receiving a command signal containing an identifier and a key value from one of the first remote controller and the second remote controller;
    searching for an identifier of an application associated with the identifier contained in the command signal from the coupling table in response to the received command signal; and
    transmitting the command signal to the application having the identifier associated with the identifier of the command signal.

6. The method according to claim 1, wherein the first sub window is displayed at a position defined by a code of the second application.

7. The method according to claim 6, further comprising executing a third application and displaying a second sub window, which displays an execution screen of the executed third application, on the screen,
    wherein the displaying the second sub window includes:
    checking whether or not a window is present at a first position defined in a code of the third application;
    displaying the second sub window at a second position defined in the code of the third application if the window is present at the first position; and
    displaying the second sub window at the first position if the window is not present at the first position.

8. The method according to claim 1, wherein the first sub window is displayed based on a preset window layout mode.

9. The method according to claim 8, further comprising executing a third application and displaying a second sub window, which displays an execution screen of the executed third application, on the screen,
    wherein the displaying the second sub window includes:
    selecting one of regions where a window is not present from among regions indicated by the window layout mode; and
    displaying the second sub window on the selected region.

10. A display device comprising:
    a controller to execute a first application and a second application;
    a display to display a main window, which displays an execution screen of the executed first application, and a first sub window which displays an execution screen of the executed second application, on a screen; and
    a receiver to receive a signal for changing a focus from a first remote controller and to receive a coupling signal containing an identifier from a second remote controller,
    wherein the controller controls to change a focused window based on the received signal and implement coupling between the focused window and the second remote controller in response to the received coupling signal, and
    wherein the controller controls display of a coupling execution checking message by means of the second remote controller, and controls display of a coupling execution guide message if an approval signal from the first remote controller is received in response to the coupling execution checking message.

11. The device according to claim 10, wherein the controller transmits the identifier to an application associated with the focused window, and controls the application to store the transmitted identifier in a storage area assigned to the application.

12. The device according to claim 11,
wherein the receiver further receives a command signal containing an identifier and a key value from one of the first remote controller and the second remote controller, and
wherein the controller transmits the command signal to the first application and the second application in response to the received command signal, controls the first application to check whether or not the identifier contained in the command signal is equal to the identifier stored in the storage area assigned to the first application and to implement a command indicated by the key value according to the checked result, and controls the second application to check whether or not the identifier contained in the command signal is equal to the identifier stored in the storage area assigned to the second application and to implement the command indicated by the key value according to the checked result.

13. The device according to claim 10, wherein the controller associates the identifier with the identifier of the executed second application to store the associated identifiers in a coupling table.

14. The device according to claim 13,
wherein the receiver receives a command signal containing an identifier and a key value from one of the first remote controller and the second remote controller, and
wherein the controller searches for an identifier of an application associated with the identifier contained in the command signal from the coupling table in response to the received command signal, and transmits the command signal to the searched application having the identifier associated with the identifier of the command signal.

15. The device according to claim 10, wherein the first sub window is displayed at a position defined in a code of the second application.

16. The device according to claim 10, wherein the controller further executes a third application and checks whether or not a window is present at a first position defined in a code of the third application, controls display of a second sub window, which displays an execution screen of the executed third application, at a second position defined in a code of the third application if the window is present at the first position, and controls display of the second sub window at the first position if the window is not present at the first position.

17. The device according to claim 10, wherein the first sub window is displayed based on a window layout mode selected by a user.

18. The device according to claim 17, wherein the controller executes a third application, selects a region where a window is not present from among regions indicated by the window layout mode, and controls display of a second sub window, which displays an execution screen of the executed third application, on the selected region.

19. A method for remotely controlling a broadcast receiver, the method comprising:
receiving a broadcast signal;
demodulating the received broadcast signal;
decoding the demodulated broadcast signal;
outputting the decoded broadcast signal through a first window on a screen, wherein the first window is coupled with a first remote controller;
outputting an execution screen of an application through a second window on the screen;
receiving a first signal for requesting a coupling from a second remote controller;
outputting a first message for initializing a coupling execution between the second window and the second remote controller;
receiving an approval signal from the second remote controller in response to the first message;
outputting a second message for guiding the coupling execution in response to the received approval signal;
receiving a coupling signal from the second remote controller; and
coupling the second window with the second remote controller in response to the received coupling signal.

* * * * *